US012418328B2

(12) United States Patent
Kim

(10) Patent No.: US 12,418,328 B2
(45) Date of Patent: *Sep. 16, 2025

(54) METHOD OF INTERWORKING BETWEEN SPECTRUM SHARING SYSTEM AND DISTRIBUTED ANTENNA SYSTEM

(71) Applicant: SOLiD, INC., Seongnam-si (KR)

(72) Inventor: Ok Jin Kim, Seongnam-si (KR)

(73) Assignee: SOLiD, INC., Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/349,383

(22) Filed: Jul. 10, 2023

(65) Prior Publication Data

US 2023/0353193 A1 Nov. 2, 2023

Related U.S. Application Data

(63) Continuation of application No. 17/348,136, filed on Jun. 15, 2021, now Pat. No. 11,716,119.

(30) Foreign Application Priority Data

Jun. 16, 2020 (KR) .................. 10-2020-0073272

(51) Int. Cl.
*H04B 7/022* (2017.01)
*H04W 16/14* (2009.01)
*H04W 72/0453* (2023.01)

(52) U.S. Cl.
CPC ............ *H04B 7/022* (2013.01); *H04W 16/14* (2013.01); *H04W 72/0453* (2013.01)

(58) Field of Classification Search
CPC ......... H04B 7/022; H04B 7/02; H04W 16/14; H04W 72/0453; H04W 88/085;
(Continued)

(56) References Cited

U.S. PATENT DOCUMENTS 11,716,119 B2 * 8/2023 Kim .................. H04W 72/0453
370/329
2019/0223025 A1 7/2019 Kakinada et al.
(Continued)

FOREIGN PATENT DOCUMENTS

AU   2017 262 114 A1   11/2018
EP      3343971 A1      7/2018
(Continued)

OTHER PUBLICATIONS

Sohul et al., "Spectrum access system for the citizen broadband radio service", Jul. 17, 2015, IEEE Communications Magazine, vol. 53, Issue: 7, pp. 18-25 (Year: 2015).*

(Continued)

*Primary Examiner* — Paul H. Masur
(74) *Attorney, Agent, or Firm* — Sughrue Mion, PLLC

(57) ABSTRACT

The disclosure provides a method of operating a distributed antenna system (DAS) interworking with a spectrum sharing system (SSS) including: transmitting, by a node unit of the DAS, DAS information to a management system entity (MSE); generating, by the MSE, linkage information based on the DAS information and radio service device (RSD) information received from at least one RSD of the SSS; transmitting, by the MSE, the interworking information to a system controller of the SSS; receiving, by the MSE, allocation information including a result of allocating shared radio resources to the DAS and the at least one RSD, respectively, according to the interworking information from the system controller; transmitting, by the MSE, the allocation information to the node unit; and operating, by the node unit, according to the allocation information.

17 Claims, 16 Drawing Sheets

(58) Field of Classification Search
CPC ..... H04W 88/18; H04W 88/08; H04W 88/12; H04W 88/14
See application file for complete search history.

(56) References Cited

U.S. PATENT DOCUMENTS

| | | | |
|---|---|---|---|
| 2019/0364527 A1* | 11/2019 | Kwon | H04B 7/15 |
| 2020/0008007 A1 | 1/2020 | Belghoul et al. | |
| 2020/0196156 A1* | 6/2020 | Kim | H04W 4/025 |
| 2020/0220580 A1* | 7/2020 | Kwon | H04L 45/66 |
| 2020/0252933 A1* | 8/2020 | Hmimy | H04W 72/0453 |
| 2020/0275457 A1* | 8/2020 | Hmimy | H04B 7/0695 |
| 2020/0305159 A1* | 9/2020 | Raghothaman | H04W 72/0453 |
| 2021/0037444 A1* | 2/2021 | Harel | H04W 16/14 |
| 2021/0099844 A1* | 4/2021 | Harel | H04W 40/248 |
| 2021/0135917 A1* | 5/2021 | Kim | H04L 45/24 |
| 2021/0153034 A1* | 5/2021 | Rosenschild | H04W 16/32 |
| 2021/0258848 A1* | 8/2021 | Das | H04L 67/1034 |
| 2021/0278527 A1* | 9/2021 | Kundalkar | G01S 13/878 |
| 2021/0328754 A1* | 10/2021 | Imanilov | H04L 5/1469 |

FOREIGN PATENT DOCUMENTS

| | | | |
|---|---|---|---|
| WO | 2019/226032 A1 | 11/2019 | |
| WO | WO 2019/226032 | * 11/2019 | ........... H04L 12/715 |

OTHER PUBLICATIONS

Atis: "Neutral Host Solutions for Multi-Operator Wireless Coverage in Managed Spaces", Alliance for Telecommunications Industry Solutions, Oct. 2016, ATIS-I-0000052, pp. 1-17, 22 pages.
The extended European search report of No. 19183961.2 dated Jan. 15, 2020.
The US Office Action of No. U.S. Appl. No. 16/421,939 dated Nov. 25, 2020.
The US Office Action U.S. Appl. No. 16/819,337 dated Nov. 25, 2020.
Vinay Bheemesh et al: "Radio Resource Management in Coordinated Antenna System Deployments" Applied Computing, Mar. 2013, pp. 573-575.
Winn Forum: "Interim SAS to CBSD Protocol Technical Report-A Historical Document WINNF-15-H-0023" Spectrum Sharing Committee Work Group 3 (Protocols), Jan. 2017, Version 1.0.0, 24 pages.
Notice of Allowance issued in parent U.S. Appl. No. 17/348,136 mailed Mar. 14, 2023.

* cited by examiner

METHOD OF INTERWORKING BETWEEN SPECTRUM SHARING SYSTEM AND DISTRIBUTED ANTENNA SYSTEM

CROSS-REFERENCE TO RELATED APPLICATION

This application is a continuation of U.S. application Ser. No. 17/348,136 filed on Jun. 15, 2021, which claims the benefit of Korean Patent Application No. 10-2020-0073272, filed on Jun. 16, 2020, in the Korean Intellectual Property Office, the disclosures of which are incorporated herein in its entirety by reference.

BACKGROUND

1. Field

One or more embodiments relate to a method of interworking between a spectrum sharing system and a distributed antenna system.

2. Description of the Related Art

In order to cope with the increasing demand of mobile traffic and the limitation of frequency spectrum (or spectrum) retrieval and relocation, the introduction of radio station management and a service system based on spectrum sharing is being actively discussed in order to efficiently utilize limited radio resources (e.g., a bandwidth and transmission power) mainly in major advanced countries.

For example, the United States has announced the introduction of Citizens Broadband Radio Service (CBRS), which is an urban spectrum sharing service in the 3.5 GHz band. In addition, the United Kingdom has announced the introduction of spectrum co-use for the 3.8 GHz to 4.2 GHz bands based on the Framework for Spectrum Sharing.

Such a spectrum sharing service is expected not only to be applied in the existing specific service field but also to provide a sufficient advantage for substituting and converging various services as well as supplementing a mobile communication service such as 5G.

A distributed antenna system (DAS) is a transmission medium such as optical fiber, wired Ethernet, and the like, or a system composed of spatially separated antenna nodes (e.g., remote units) connected to a common node (e.g., a head-end unit) through a transmission network.

The DAS is installed in an area where radio signals are not received or where radio signals are weak, such as inside buildings, underground buildings, subways, tunnels, apartment complexes in a residential area, stadiums, and the like to extend coverage of a base station by providing communication services to even a shadow area where signals of the base station are difficult to reach.

The DAS is closely related to a neutral host radio access network model proposed by the CBRS Alliance, and is likely to interwork with the spectrum sharing system or to be applied as a part of the spectrum sharing system.

However, a concrete method of interworking between the DAS and the spectrum sharing system has not been proposed yet.

SUMMARY

One or more embodiments include a method of interworking between a spectrum sharing system and a distributed antenna system.

The disclosure is not limited to the above objectives, but other objectives not described herein may be clearly understood by those of ordinary skilled in the art from descriptions below.

According to an aspect of the disclosure, there is provided a method of operating a distributed antenna system (DAS) interworking with a spectrum sharing system (SSS), the method includes: transmitting, by a node unit of the DAS, DAS information to a management system entity (MSE); generating, by the MSE, interworking information based on the DAS information and radio service device (RSD) information received from at least one RSD of the SSS; transmitting, by the MSE, the interworking information to a system controller of the SSS; receiving, by the MSE, allocation information including a result of allocating shared radio resources to the DAS and the at least one RSD, respectively, according to the interworking information from the system controller; transmitting, by the MSE, the allocation information to the node unit; and operating, by the node unit, according to the allocation information.

According to an exemplary embodiment, the interworking information may include information about at least two of an indication of an interworking state of the at least one RSD and the DAS, an indication of radio access technology (RAT) provided by the at least one RSD through the DAS, operation parameters related to the RAT, a geographic location, an available channel, and an available frequency spectrum range.

According to an exemplary embodiment, the method may further include, transmitting, by the MSE, the allocation information to the at least one RSD after the receiving of the allocation information.

According to an exemplary embodiment, the transmitting of the interworking information may include, transmitting, by the MSE, the interworking information to the system controller as part of a registration process for the system controller of the DAS and the at least one RSD.

According to an exemplary embodiment, the transmitting of the interworking information may include, transmitting, by the MSE, the interworking information to the system controller through at least one of a resource request to the system controller or periodic status update of the DAS and the at least one RSD.

According to an exemplary embodiment, the MSE may be configured to operate and manage the DAS by controlling the operation of the node unit.

According to an exemplary embodiment, the MSE may be configured to control an operation of the at least one RSD to operate and manage the SSS.

According to an exemplary embodiment, the node unit may be a head-end unit of the DAS communicatively connected to the at least one RSD.

According to an exemplary embodiment, the node unit may be a remote unit of the DAS communicatively connected to the at least one RSD.

According to an aspect of the disclosure, there is provided a method operating a distributed antenna system (DAS) interworking with a spectrum sharing system (SSS), the method includes: transmitting, by a node unit of the DAS, DAS information to a management system entity (MSE); generating, by the MSE, virtualized RSD information based on the DAS information and radio service device (RSD) information received from at least one RSD of the SSS; transmitting, by the MSE, the virtualized RSD information to a system controller of the SSS; receiving, by the MSE, allocation information including a result of allocating radio resources integrally shared to the DAS and the at least one RSD according to the virtualized RSD information from the system controller; determining, by the MSE, an operation of the DAS based on the allocation information; and operating, by the node unit, according to the determined operation.

According to an exemplary embodiment, the virtualized RSD information may be information that causes the system controller of the SSS to recognize the at least one RSD and the DAS as one device or the DAS as an extension device of the at least one RSD.

According to an exemplary embodiment, the virtualized RSD information may include information about at least two of an indication of a radio access technology (RAT) integrally supported by the at least one RSD and the DAS, operation parameters related to the RAT, a geographic location, an available channel, and an available frequency spectrum range.

According to an exemplary embodiment, the determining of the operation of the DAS may include, determining, by the MSE, an operation of the at least one RSD based on the allocation information.

According to an exemplary embodiment, the transmitting of the virtualized RSD information may include, transmitting, by the MSE, the virtualized RSD information to the system controller as part of a registration process for the system controller of the DAS and the at least one RSD.

According to an exemplary embodiment, the transmitting of the virtualized RSD information may include, transmitting, by the MSE, the virtualized RSD information to the system controller through at least one of a resource request to the system controller or periodic status update of the DAS and the at least one RSD.

According to an aspect of the disclosure, there is provided a method operating a distributed antenna system (DAS) interworking with a spectrum sharing system (SSS), the method includes: transmitting, by a node unit of the DAS, DAS information to the at least one RSD so that at least one radio service device (RSD) of the SSS generates interworking information or virtualized RSD information; receiving, by a management system entity (MSE), the interworking information or the virtualized RSD information from the at least one RSD; transmitting, by the MSE, the interworking information or the virtualized RSD information to a system controller of the SSS; receiving, by the MSE, allocation information including a result of allocating shared radio resources according to the interworking information or the virtualized RSD information from the system controller; transmitting, by the MSE, the allocation information to the at least one RSD; and operating, by the node unit, under the control of the at least one RSD.

According to an aspect of the disclosure, there is provided a method operating a distributed antenna system (DAS) interworking with a spectrum sharing system (SSS), the method includes: receiving, by a node unit of the DAS, radio service device (RSD) information from at least one RSD of the SSS; generating, by the node unit, interworking information or virtualized RSD information based on DAS information and the RSD information; transmitting, by the node unit, the interworking information or the virtualized RSD information to a management system entity (MSE); transmitting, by the MSE, the interworking information or the virtualized RSD information to a system controller of the SSS; receiving, by the MSE, allocation information including a result of allocating shared radio resources according to the interworking information or the virtualized RSD information from the system controller; transmitting, by the MSE, the allocation information to the node unit; and operating, by the node unit, according to the allocation information.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
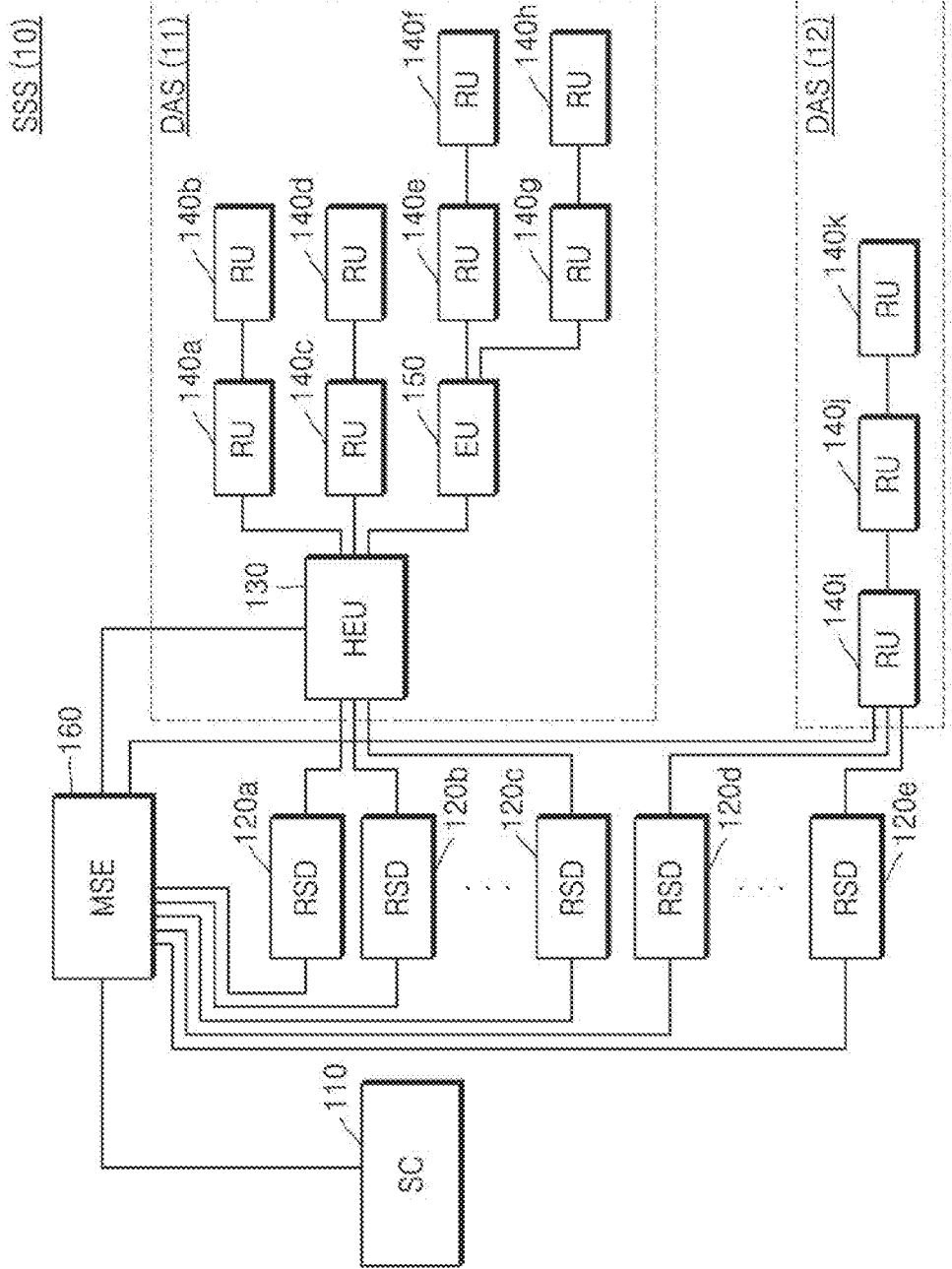
FIG. 1 is a block diagram of a spectrum sharing system interworking with a distributed antenna system according to an embodiment.

An example of a spectrum sharing system of the disclosure is a Citizens Broadband Radio Service (CBRS) system specified by the United States Federal Communications Commission (FCC). Hereinafter, for convenience of description, technologies proposed in the disclosure will be described on the premise of the CBRS system. However, such a description does not limit that the technologies proposed in the disclosure are applied to various spectrum sharing systems (e.g., Licensed Spectrum Access (LSA) system specified by Europe) other than the CBRS system.

The spectrum sharing system of the disclosure is a new type of system in which two or more wireless communication systems provide authorized shared access in conjunction with an in-building wireless communication system (e.g., a distributed antenna system (DAS)), which is further developed from a general CBRS system that provides or participates in authorized shared access between two or more wireless communication networks or two or more wireless communication systems (e.g., citizens broadband service devices (CBSDs) or CBSD domain proxies).

As the spectrum sharing system of the disclosure operates with the in-building wireless communication system, such as a distributed antenna system, as an element, it is required to protect radio resources from each other based on constraints due to radio access technologies being used by the in-building wireless communication system, as well as radio access technologies (RATs) being used by general competing users or wireless communication systems, and a plurality of operating modes for the RATs.

In a case of the DAS implemented with neutral host architecture, various radio services are integrated and provided within a service coverage. This is because various problems such as interference may be caused when the radio resources are shared without considering interworking (or interoperating) of the DAS in the spectrum sharing system.

In order to meet these requirements and to allow for optimization of radio resource allocations, various aspects of the disclosure suggest technologies that allow system controllers of the spectrum sharing system to directly or indirectly recognize whether CBSDs (or CBSD domain proxies) interworks (or interoperates) with a DAS, and to optimize the allocation of radio resources to the CBSDs and the DAS based on a result of the recognition of interworking.

In particular, various aspects of the disclosure suggest technologies that allow the system controllers of the spectrum sharing system to receive certain information indicating an interworking status of the CBSDs (or CBSD domain proxies) and the DAS from a management system entity, to use the received information to recognize whether the CBSDs (or CBSD domain proxies) and the DAS are interworking with each other, and to optimize the allocation of radio resources to the CBSDs and the DAS based on a result of the recognition of interworking.

In various embodiments, the technologies described in the disclosure and systems and devices for implementation thereof may utilize RATs such as WiFi or WiMax as well as RATs such as code division multiple access (CDMA), time division multiple access (TDMA), frequency division multiple access (FDMA), orthogonal FDMA (OFDMA), single-carrier FDMA (SC-FDMA), LTE, a global system for mobile communications (GSM), 5G NR, and the like to support shared access to the radio spectrum between networks (or systems).

Various other embodiments and features according to the disclosure will be further described later below. It should be apparent that the teachings herein may be implemented in a wide variety of forms and any particular structure, function, or both, disclosed herein are merely exemplary, and not limiting. Based on the teachings herein, one of ordinary skill in the art will appreciate that aspects disclosed herein may be implemented independently of any other aspects, and two or more of these aspects may be combined in various ways. For example, a device or a method may be implemented by using any number of aspects set forth herein. Furthermore, the device or the method may be implemented with structures and functions of one or more of the aspects described herein, or may be implemented by using structures and functions of other aspects. For example, the method may be implemented as part of instructions stored on a non-transitory computer-readable recording medium for execution on a system, a device, an apparatus and/or a processor, or a computer. Furthermore, one aspect may include at least one component of the claim.

Hereinafter, various embodiments of the disclosure will be described in detail in order.

FIG. 1 is a block diagram of a spectrum sharing system (SSS) 10 according to an embodiment.

The SSS 10 may include a system controller (SC) 110, radio service devices (RSDs) 120a to 120e, first and second distributed antenna systems (DAS) 11 and 12, and a management system entity (MSE) 160.

The SSS 10 provides some degree of protection to existing users (e.g., fixed satellite systems, WISPs, and government/military systems) with potentially higher priorities, other users, and radio service providers while allowing shared radio resources by control of the SC 110, for example, operating frequencies, power limits, a geographical area, or the like, to be dynamically allocated to multiple users and radio service providers related to the RSDs 120a to 120e and the first and second DAS 11 and 12.

The SC 110 may control overall spectrum sharing in the SSS 10, through the MSE 160, by accepting requests for use of the shared radio resources from the RSDs 120a to 120e and/or the first and second DAS 11 and 12, by solving conflicts or over-constraints in these requests, and by approving the use of the shared radio resources for the radio access services.

For example, the SC 110 may receive interworking information of the RSDs 120a to 120e transmitted from the MSE 160 and a corresponding one of the first and second DAS 11 and 12 during a registration and resource request or a periodic status update process from among operation procedures for allocation and reallocation of the shared radio resources. The SC 110 may determine whether the RSDs 120a to 120e interwork with the corresponding one of the first and second DAS 11 and 12 based on the received interworking information, and allocate the shared radio resources in consideration of a result of the determination. This will be described in more detail later with reference to FIGS. 3 to 11.

The term "interworking" means that the RSDs 120a to 120e are used as signal sources of at least one of the first and second DAS 11 and 12.

In addition, the term "determining" encompasses a wide variety of actions. For example, the term "determining" may include computing, processing, deriving, examining, looking up (e.g., looking up in a table, database, or other data structure), identifying, and the like. The term "determining" may also include receiving (e.g., receiving information), accessing (accessing data in a memory), and the like. The term "determining" may also include resolving, selecting, choosing, establishing, and the like.

The RSDs 120a to 120e may be devices that provide radio services using any radio access technology, such as a base station, an access point, or any type of radio frequency (RF) access system.

The RSDs 120a to 120e may be communicatively connected to the MSE 160 and/or a node unit of any one of the first and second DAS 11 and 12. In addition, the RSDs 120a to 120e may be communicatively connected to the SC 110 through the MSE 160 and/or any one node unit of the first and second DAS 11 and 12. As the RSDs 120a to 120e are not directly connected to the SC 110 but indirectly connected to the SC 110 through the MSE 160 or the like, when the number of RSDs constituting the SSS 10 increases, it is possible to effectively reduce the burden of managing, controlling, and operating the RSDs of the SC 110.

The RSDs 120a to 120e may provide a radio service to end user devices in a cell using a spectrum allocated by indirect control of the SC 110 (e.g., control through the MSE 160, the first and second DAS 11 and 12, etc.).

Alternatively, the RSDs 120a to 120e may provide a radio service to the end user devices through a corresponding one of the first and second DAS using the spectrum allocated by the indirect control of the SC 110.

Although not shown in FIG. 1, some of the RSDs 120a to 120e may be communicatively connected to the SC 110 and may provide a radio service to the end user devices in the cell directly or through a corresponding one of the first and second DAS 11 and 12 by using a spectrum allocated by direct control of the SC 110.

In addition, although not shown in FIG. 1, some of the RSDs 120a to 120e may be connected to other RSDs, and thus may each function as a domain proxy for lower RSDs.

Each of the first and second DAS 11 and 12 may combine/distribute a radio service provided from at least one corresponding one of the RSDs 120a to 120e by the indirect control of SC 110 (control through the MSE 160 or the at least one corresponding RSD of the RSDs 120a to 120e), and may provide the radio service to end user devices within coverage.

According to an embodiment, the first DAS 11 may include a head-end unit (HEU) 130 connected to the RSDs 120*a*, 120*b*, and 120*c* and/or the MSE 160, remote units (RU) 140*a* and 140*c* connected to the HEU 130 in a point-to-multipoint structure, and RUs 140*b* and 140*d* respectively connected to corresponding ones of the RUs 140*a* and 140*c* in a daisy chain structure.

As shown in FIG. 1, the first DAS 11 may further optionally include an expansion unit (EU) 150, and RUs 140*e* to 140*h* may be connected to the EU 150 in a mixed form of the point-to-multipoint structure and the daisy-chain structure.

The first DAS 11 may provide radio services from the RSDs 120*a*, 120*b*, and 120*c* to the end user devices by using a radio resource allocated according to the indirect control of the SC 110 (e.g., control through the MSE 160 or the RSDs 120*a*, 120*b*, and 120*c*).

According to an embodiment, the second DAS 12 may include an RU 140*i* connected to the RSDs 120*d* and 120*e* and/or the MSE 160, and RUs 140*j* and 140*k* connected to the RU 140*i* in a daisy chain structure.

The RUs 140*i*, 140*j*, and 140*k* may process a plurality of radio services in an integrated manner, unlike a remote radio head, which is an RF processing device of a distributed base station. FIG. 1 shows only an embodiment in which the RUs 140*i*, 140*j*, and 140*k* are directly connected to the RSDs 120*d* and 120*e*, but the RUs 140*i*, 140*j*, and 140*k* may also be connected to the RSDs 120*d* and 120*e* through a certain network.

The second DAS 12 may provide radio services from the RSDs 120*d* and 120*e* to the end user devices by using the radio resource allocated according to the indirect control of the SC 110 (e.g., control through the MSE 160 or the RSDs 120*d*, 120*e*).

The MSE 160 may be communicatively connected to the SC 110 and the RSDs 120*a* to 120*e* and/or the node unit of each of the first and second DAS 11 and 12.

According to an embodiment, the MSE 160 may generate interworking information indicating an interworking state based on certain information transmitted from the RSDs and the node units of the first and second DAS 11 and 12, and the like, and may transmit the interworking information and the like to the SC 110 so that shared radio resources are allocated according to the interworking information.

According to an embodiment, the MSE 160 may receive interworking information and the like from the RSDs 120*a* to 120*e* and the node units of the first and second DAS 11 and 12, and may transmit the received interworking information and the like to the SC 110 so that shared radio resources are allocated according to the received interworking information and the like.

The MSE 160 may receive allocation information including a result of the allocation of the shared radio resources from the SC 110, and may transmit the received allocation information to the RSDs 120*a* to 120*e* and/or to the node units of the first and second DAS 11 and 12.

The MSE 160 may be a system for integrated management and operation of the RSDs 120*a* to 120*e* and the first and second DAS 11 and 12 as described above, but is not limited thereto. In an embodiment, the MSE 160 may be a network management system or a DAS management system provided by a manufacturer of the first and second DAS 11 and 12. In another embodiment, the MSE 160 may be a network management system provided by a manufacturer of the SC 110 and the RSDs 120*a* to 120*e*.

On the other hand, according to the disclosure, elements of the SSS 10, that is, the node units (HEU, RU, and EU) constituting the SC, RSD, and DAS, the number of MSEs, and a topology for connecting them are not limited to the embodiment shown in FIG. 1, and various modifications and variations are possible.

FIGS. 2A to 2F are block diagrams of elements of a spectrum sharing system according to an embodiment. In the description of FIGS. 2A to 2F, the same or corresponding reference numerals as those in FIG. 1 denote the same or corresponding elements, and therefore, repeated descriptions thereof will not be given herein.

Figure 2A:
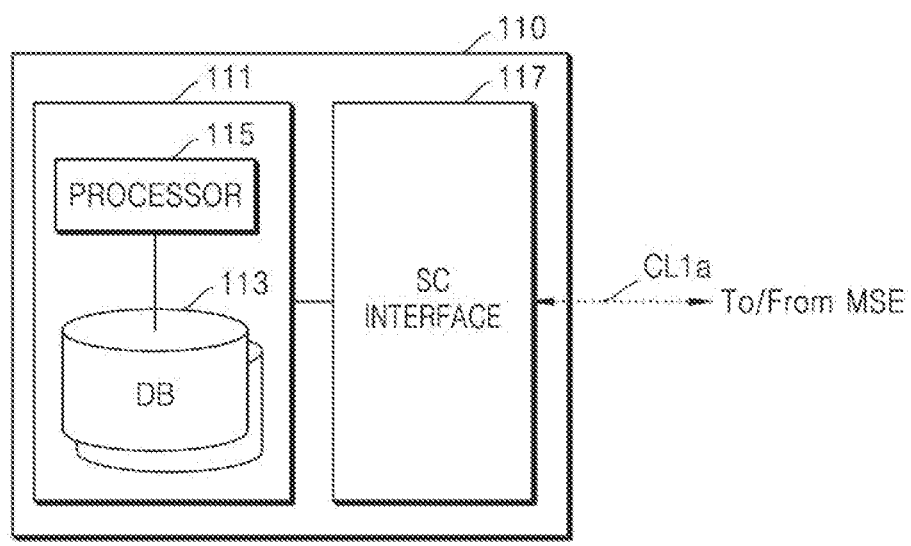
FIGS. 2A to 2F are block diagrams of elements of a spectrum sharing system according to an embodiment.

Referring to FIGS. 1 and 2A, the SC 110 may include a system controller processing system 111 (hereinafter referred to as an SC processing system) and a system controller interface 117 (hereinafter referred to as an SC interface).

The SC processing system 111 may control all operations of the SSS 10. For example, the SC processing system 111 may control processing operations for a registration request of at least one RSD and/or at least one DAS communicatively connected to the SC processing system 111 through the MSE 160, processing operations for a radio resource/authorization request, status update processing operations thereof, and the like.

In particular, the SC processing system 111, as part of the above-described operations or as a separate operation, may check whether the RSD interworks with the DAS to reflect an interworking operation state when shared radio resources are allocated.

The SC processing system 111 may include at least one database 113 and a processor 115.

The at least one database 113 may store rules necessary for management and operation of the SSS 10, various information about users, for example, information about priorities (e.g., a top-level incumbent user, a priority access authorized user, a general access authorized user), geographical location and/or time information, coverage, an maximum allowable power output level, a modulation type, interference threshold information, and so on.

The processor 115 may determine whether the RSD interworks with the DAS based on identification information of the RSD and/or the DAS (in more detail, node units of the DAS such as HEU, RU, and EU), interworking information, virtualized RSD information, and the like transmitted from the MSE 160. Specific embodiments thereof will be described in more detail later with reference to FIGS. 3 to 10.

The processor 115 may be connected to the database 113 and recognize a spectrum usage state, a usage amount, and the like of users having priority at specific times and/or geographical locations related to the RSD and the DAS that are determined whether to interwork with each other.

The processor 115 may allocate radio resources available for the RSD and the DAS based on a result of the recognition.

The processor 115 may transmit allocation information indicating a result of the allocation of the radio resources to an RSD 120 and/or the DAS to control the use of the shared radio resources by the RSD 120 and the DAS.

The SC processing system 111 may be communicatively connected to the MSE 160 through a first communication link CL1*a*, and may transmit and receive information for spectrum sharing access control to and from the MSE 160 through the SC interface 117.

The SC processing system 111 may transmit and receive the information to and from the MSE 160 through the SC interface 117 by using a security protocol such as a Hyper-Text Transfer Protocol over Secure Socket Layer (HTTPS) protocol.

The first communication link CL1*a* may be, for example, but is not limited to, the Internet, and may be any wired and/or wireless communication link such as WiMax, network optical fiber, an Ethernet-based cable, and the like.

Figure 2B:
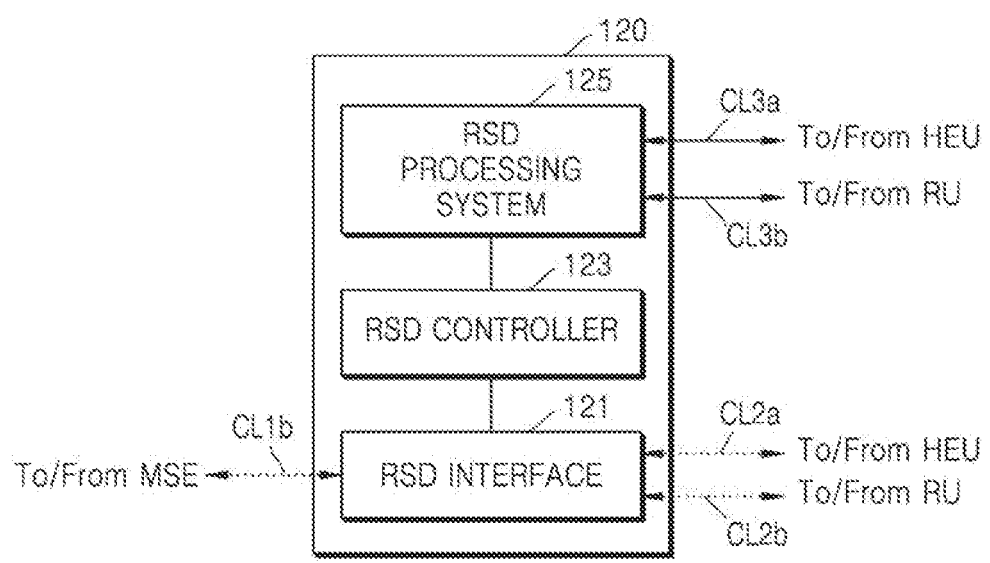

Referring to FIGS. 1 and 2B, the RSD 120 may include a radio service device interface 121 (hereinafter referred to as an RSD interface), a radio service device controller 123 (hereinafter referred to as an RSD controller), and a radio service device processing system 125 (hereinafter referred to as an RSD processing system).

The RSD interface 121 is for the RSD 120 to transmit and receive pieces of information necessary for spectrum sharing access to and from the MSE 160, and HEU 130, and an RU 140.

The RSD 120 may transmit and receive the information to and from the MSE 160 connected to the RSD 120 through a first communication link CL1*b*, and the HEU 130 and the RU 140 connected to the RSD 120 through second communication links CL2*a* and CL2*b*, respectively, by using the RSD interface 121.

The first communication link CL1*b* and the second communication links CL2*a* and CL2*b* may be, for example, but are not limited to, the Internet, and may be any wired and/or wireless communication link such as WiMax, network optical fiber, an Ethernet-based cable, and the like.

The RSD controller 123 may generate its own information related to a radio service or the like provided by the RSD 120, interworking information indicating whether to interwork with the DAS, virtualized RSD information, and the like, and may transmit these information to the MSE 160, the HEU 130, or the RU 140 through the RSD interface 121.

The RSD controller 123 may control the RSD processing system 125 according to allocation information or the like transmitted from the MSE 160 or from the HEU 130 and the RU 140 through the RSD interface 121.

The RSD processing system 125 may activate a radio resource (e.g., a frequency spectrum or channel) allocated by the control of the RSD controller 123 and use the activated radio resource to generate service signals of radio access technology that the RSD 120 may support.

The RSD processing system 125 may transmit the generated service signals to the HEU 130 and the RU 140 through third communication links CL3*a* and CL3*b*.

The third communication links CL3*a* and CL3*b* may be media for transmitting analog or digital type service signals, for example, an RF cable, an optical fiber, an Ethernet-based cable, and the like. Although not shown in FIG. 2B, the RSD processing system 125 may include converters for converting the generated service signals to correspond to the third communication links CL3*a* and CL3*b*.

Figure 2C:
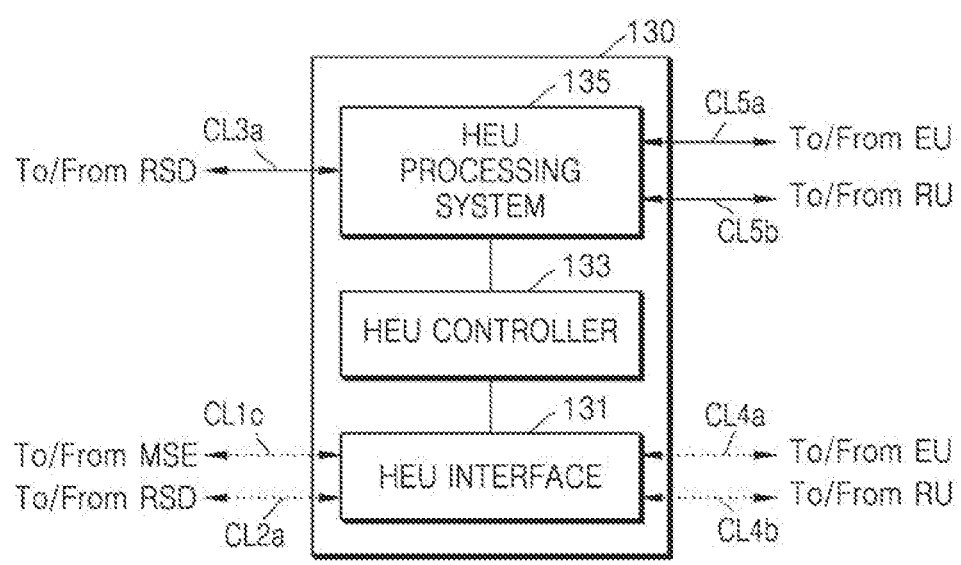

Referring to FIGS. 1 and 2C, the HEU 130 may include a head-end unit interface 131 (hereinafter referred to as an HEU interface), a head-end unit controller 133 (hereinafter referred to as an HEU controller), and a head-end unit processing system 135 (hereinafter referred to as an HEU processing system).

The HEU interface 131 is for the HEU 130 to transmit and receive pieces of information necessary for spectrum sharing access to and from the RSD 120, the RU 140, the EU 150, and the MSE 160.

The HEU 130 may transmit the above-described pieces of information to the RSD 120 by using a certain security protocol, for example, a HTTPS protocol.

The HEU 130 may transmit and receive pieces of information such as allocation information to and from the MSE 160, the RU 140, and the EU 150 by using the above-described security protocol or another security protocol defined by a manufacturer of the DAS.

The HEU 130 may transmit and receive the pieces of information to and from the MSE 160 connected to the HEU 130 through a first communication link CL1*c*, the RSD 120 connected to the HEU 130 through the second communication link CL2*a*, and the EU 150 and the RU 140 connected to the HEU 130 through fourth communication links CL4*a* and CL4*b*, respectively, by using the HEU interface 131.

The fourth communication links CL4*a* and CL4*b* may be, for example, but are not limited to, the Internet, and may include any wired and/or wireless communication link such as WiMax, network optical fiber, an Ethernet-based cable, and the like.

The HEU controller 133 may generate interworking information, virtualization information, and the like indicating whether to interwork with the RSD 120, and may transmit these information to the MSE 160 or the RSD 120 through the HEU interface 131.

The HEU controller 133 may control the HEU processing system 135 according to allocation information transmitted from the MSE 160 or from the RSD 120 through the HEU interface 131. The transmitted allocation information may be transmitted to the RU 140 and the EU 150 through the HEU interface 131.

The HEU processing system 135 may receive service signals of the radio access technology from the RSD 120 through the third communication link CL3*a*. FIG. 2C shows an embodiment in which one RSD 120 is connected to the HEU 130. However, when a plurality of RSDs 120 are connected to the HEU 130, the third communication link CL3*a* may be plural (see FIG. 3, etc.).

The HEU processing system 135 may perform processes such as noise cancellation, filtering, combining, and the like, in an analog way and/or digitally using radio resources allocated by the control of the HEU controller 133 to the received service signals, and may transmit the combined service signals to the RU 140 and the EU 150 through the fifth communication links CL5*a* and CL5*b*.

The fifth communication links CL5*a* and CL5*b* may be media for transmitting analog or digital type service signals, for example, an RF cable, an optical fiber, an Ethernet-based cable, and the like. Although not shown in FIG. 2C, the HEU processing system 135 may include converters for converting the combined service signals to correspond to the fifth communication links CL5*a* and CL5*b*.

Figure 2D:
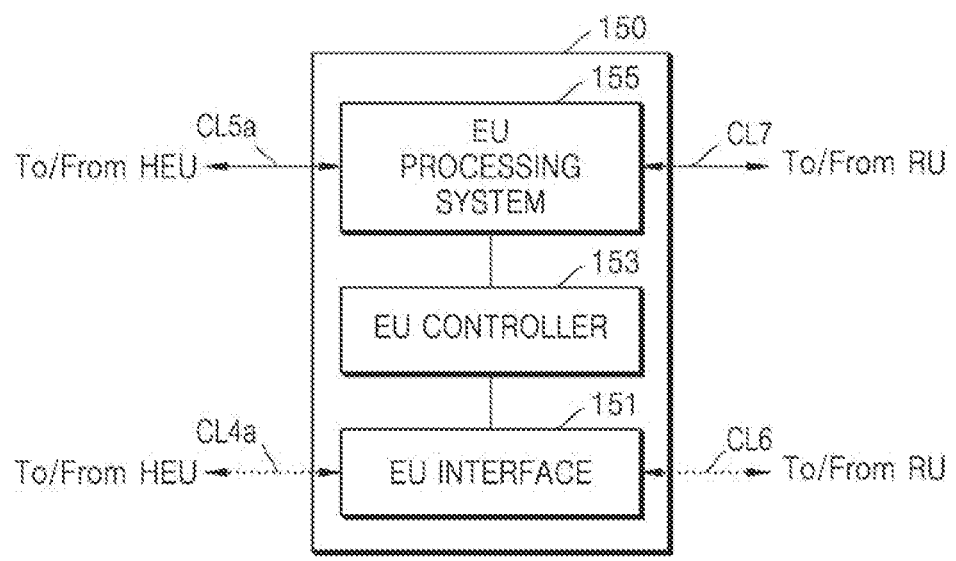

Referring to FIGS. 1 and 2D, the EU 150 may include an expansion unit interface 151 (hereinafter referred to as an EU interface), an expansion unit controller 153 (hereinafter referred to as an EU controller), and an expansion unit processing system 155 (hereinafter referred to as an EU processing system).

The EU interface 151 is for transmitting and receiving pieces of information necessary for spectrum sharing access to and from the HEU 130 and the RU 140.

The EU 150 may transmit and receive the necessary pieces of information to and from the HEU 130 and the RU 140 by using a security protocol such as an HTTPS protocol or other security protocols defined by a manufacturer of the DAS.

The EU 150 may transmit and receive the necessary pieces of information to and from the HEU 130 connected to the EU 150 through the fourth communication link CL4*a* and the RU 140 connected to the EU 150 through a sixth communication link CL6 by using the EU interface 151.

The sixth communication link CL6 may be, for example, but is not limited to, the Internet, and may include any wired and/or wireless communication link such as WiMax, network optical fiber, an Ethernet-based cable, and the like.

The EU controller 153 may control the EU processing system 155 according to allocation information of radio resources transmitted from the HEU 130 through the EU interface 151.

The EU processing system 155 may receive combined service signals from the HEU 130 through the fifth communication link CL5*a* and perform processes such as amplification and the like on the combined service signals in an analog way and/or digitally by using the radio resources allocated by the control of the EU controller 153. Thereafter, the EU processing system 155 may transmit the processed service signals to the RU 140 through a seventh communication link CL7.

The seventh communication link CL7 may be a medium for transmitting analog or digital type service signals, for example, an RF cable, an optical fiber, an Ethernet-based cable, and the like. Although not shown in FIG. 2D, the EU processing system 155 may include a converter for converting the signal received through the fifth communication link CL5*a* into a signal suitable for processing therein and converters for converting the processed signal to correspond to the seventh communication link CL7.

Figure 2E:
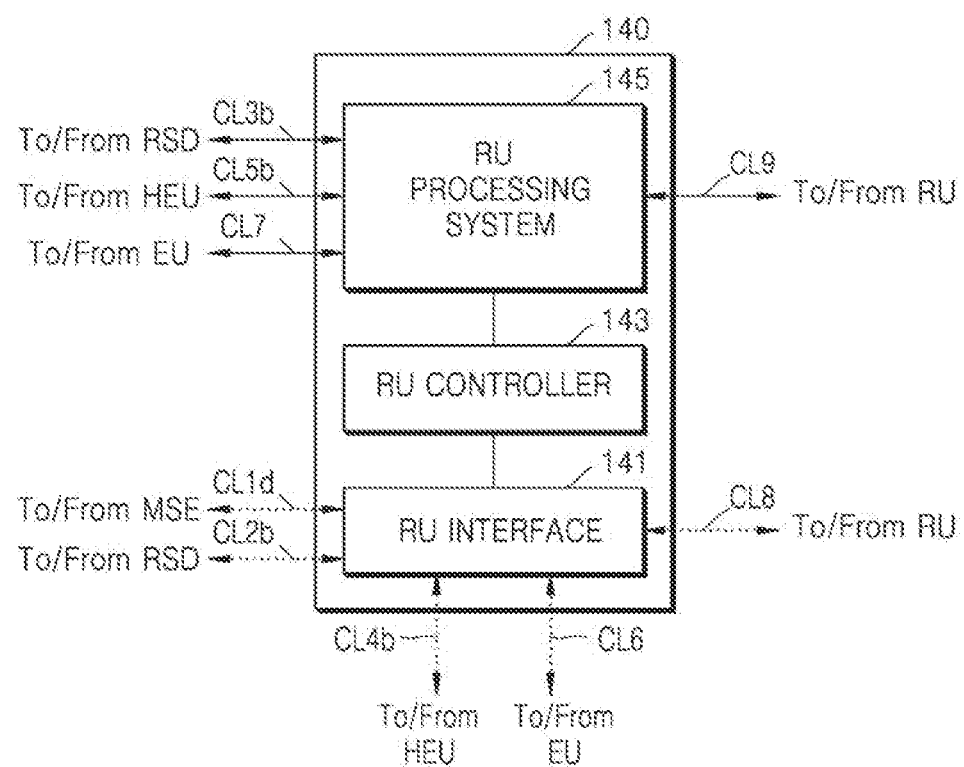

Referring to FIGS. 1 and 2E, the RU 140 may include a remote unit interface 141 (hereinafter referred to as an RU interface), a remote unit controller 143 (hereinafter referred to as an RU controller), and a remote unit processing system 145 (hereinafter referred to as an RU processing system).

The RU interface 141 is for transmitting and receiving pieces of information necessary for spectrum sharing access to and from the MSE 160, the RSD 120, the HEU 130, the EU 150, and other RUs.

The RU 140, according to an embodiment, may transmit and receive the pieces of information to and from the MSE 160 and the RSD 120 by using a security protocol such as an HTTPS protocol and may also transmit and receive the pieces of information to and from the HEU 130 and the EU 150 by using other security protocols besides the HTTPS protocol.

The RU 140 may transmit and receive the pieces of information to and from the MSE 160 connected to the RU 140 through a first communication link CL1*d*, and the RSD 120, the HEU 130, the EU 150, and other RUs that are connected to the RU 140, respectively, through the first communication link CL1*c*, the second communication link CL2*b*, the fourth communication link CL4*b*, the sixth communication link CL6, and an eighth communication link CL8.

The eighth communication link CL8 may be, for example, but is not limited to, the Internet, and may include any wired and/or wireless communication link such as WiMax, network optical fiber, an Ethernet-based cable, and the like.

The RU controller 143 may control the RU processing system 145 according to allocation information of radio resources transmitted from the MSE 160, the RSD 120, the HEU 130, or the EU 150 through the RU interface 141.

The RU processing system 145 may receive a service signal from the RSD 120 through the third communication link CL3*b*, combined service signals from the HEU 130 through the fifth communication link CL5*b*, or amplified service signals from the EU 150 through the seventh communication link CL7.

The RU processing system 145 may perform processes such as filtering, amplification, and the like for the received service signals in an analog way and/or digitally using radio resources allocated by the control of the RU controller 143, and may transmit the processed service signals to an end-user device or another RU through a ninth communication link CL9.

The ninth communication link CL9 may be a medium for transmitting analog or digital type service signals, for example, an RF cable, an optical fiber, an Ethernet-based cable, and the like. Although not shown in FIG. 2E, the RU processing system 145 may include a converter for converting the service signals received through the third communication link CL3*b*, the fifth communication link CL5*b*, and the seventh communication link CL7 into signals suitable for processing therein and a converter for converting amplified signals to correspond to the ninth communication link CL9.

Figure 2F:
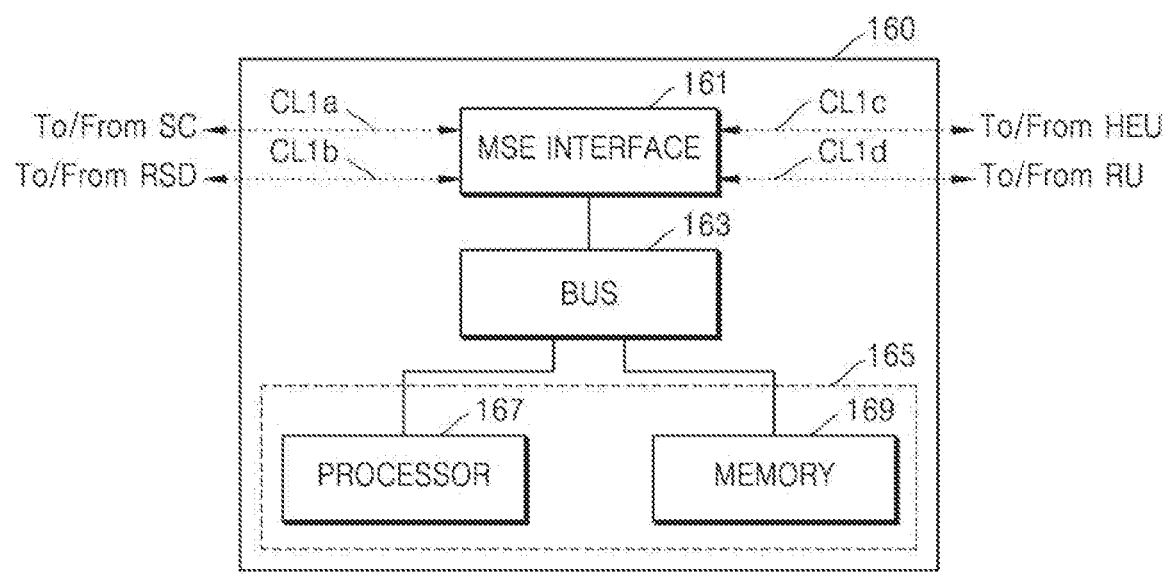

Referring to FIGS. 1 and 2F, the MSE 160 may include a management system entity interface 161 (hereinafter referred to as an MSE interface), a bus 163, and a management system entity processing system 165 (hereinafter referred to as an MSE processing system).

The MSE interface 161 is for the MSE 160 to transmit and receive pieces of information necessary for spectrum sharing access to and from the SC 110, the RSD 120, the HEU 130, and the RU 140.

The MSE 160 may transmit and receive the pieces of information to and from the SC 110, the RSD 120, the HEU 130, and the RU 140 connected to the MSE 160 through the first communication links CL1*a*, CL1*b*, CL1*c*, and CL1*d*, respectively, by using the MSE interface 161.

As described above, the first communication links CL1*a*, CL1*b*, CL1*c*, and CL1*d* may be, for example, but are not limited to, the Internet, and may be any wired and/or wireless communication link such as WiMax, network optical fiber, an Ethernet-based cable, and the like.

The bus 163 may communicatively connect the MSE interface 161 to the MSE processing system 165.

The MSE processing system 165 may include a processor 167 and a memory 169.

The processor 167, based on identification information of at least one RSD and a DAS received (or pre-saved) through the MSE interface 161 or information about radio access technology, may be any device suitable for executing program instructions for generating interworking information indicating an interworking status of the RSD and the DAS, virtualized RSD information representing the RSD and the DAS as a virtual unified RSD, or the like.

Alternatively, the processor 167 may be any device suitable for executing a program instruction for processing interworking information received from the RSD or the DAS through the MSE interface 161, virtualized RSD information, or the like.

The processor 167 may be any device suitable for executing program instructions for monitoring, managing, controlling, and operating all operating states of RSDs 120, or program instructions for monitoring, managing, controlling, and operating all operating states of the DAS.

The memory 169 may be any non-transitory medium for storing the program instructions described above that define an operation of MSE 160. For example, the memory 169 may be ROM, RAM, an optical storage, a magnetic storage, a flash memory, or any other medium.

Figure 3:
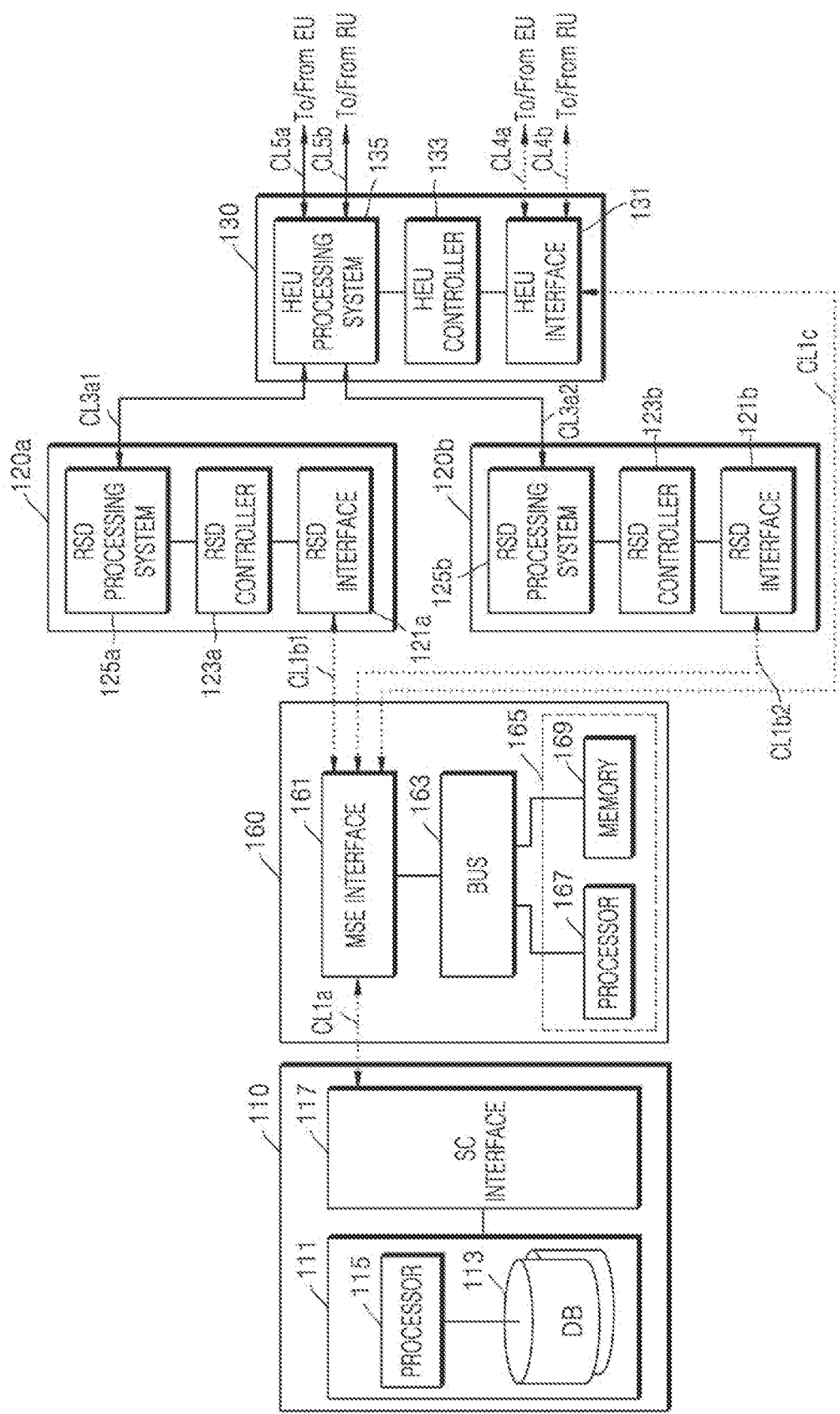
FIG. 3 is a block diagram of a spectrum sharing system according to an embodiment.
Figure 4:
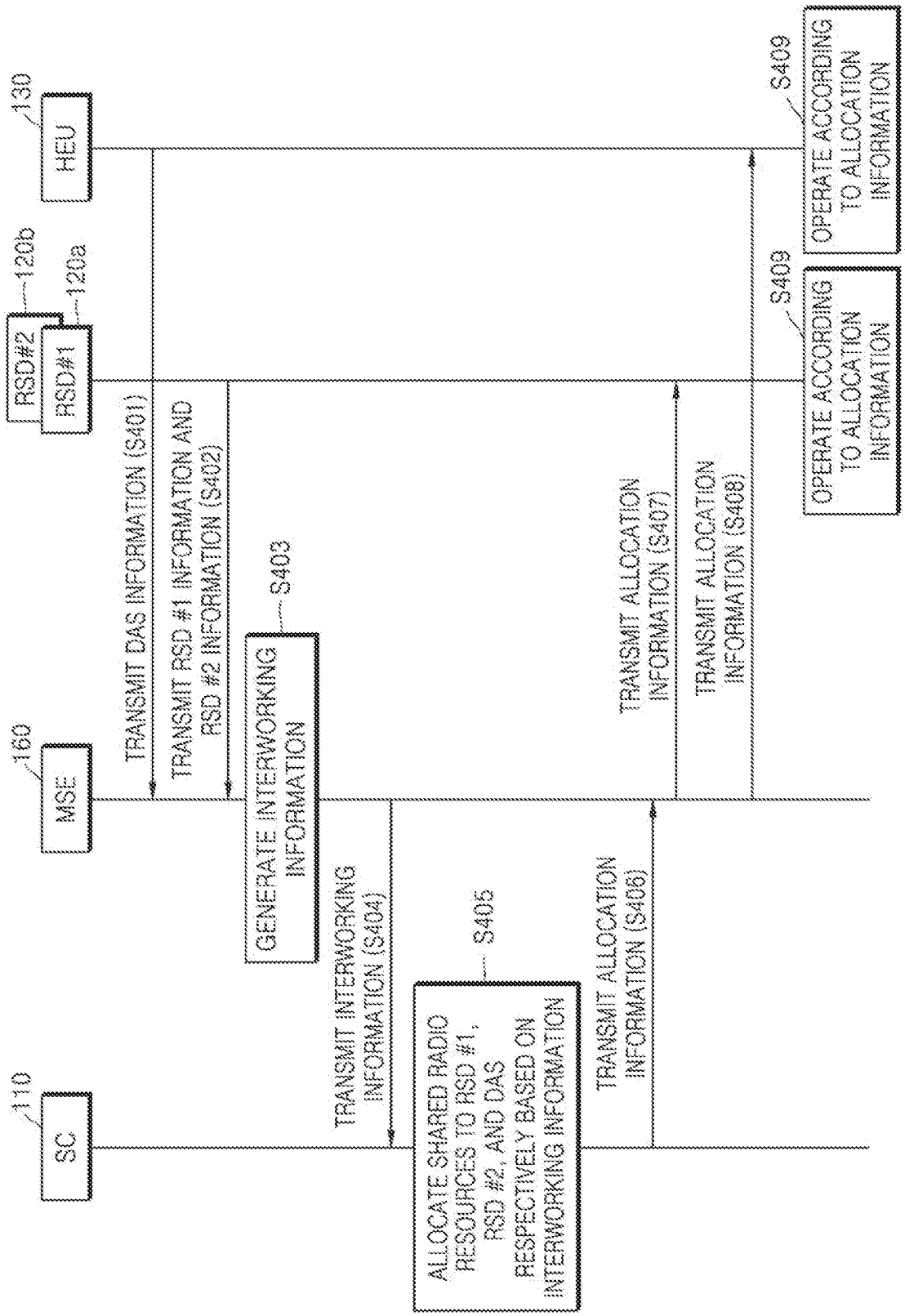
FIGS. 4 and 5 are flowcharts for illustrating a method of operating the spectrum sharing system shown in FIG. 3.
Figure 5:
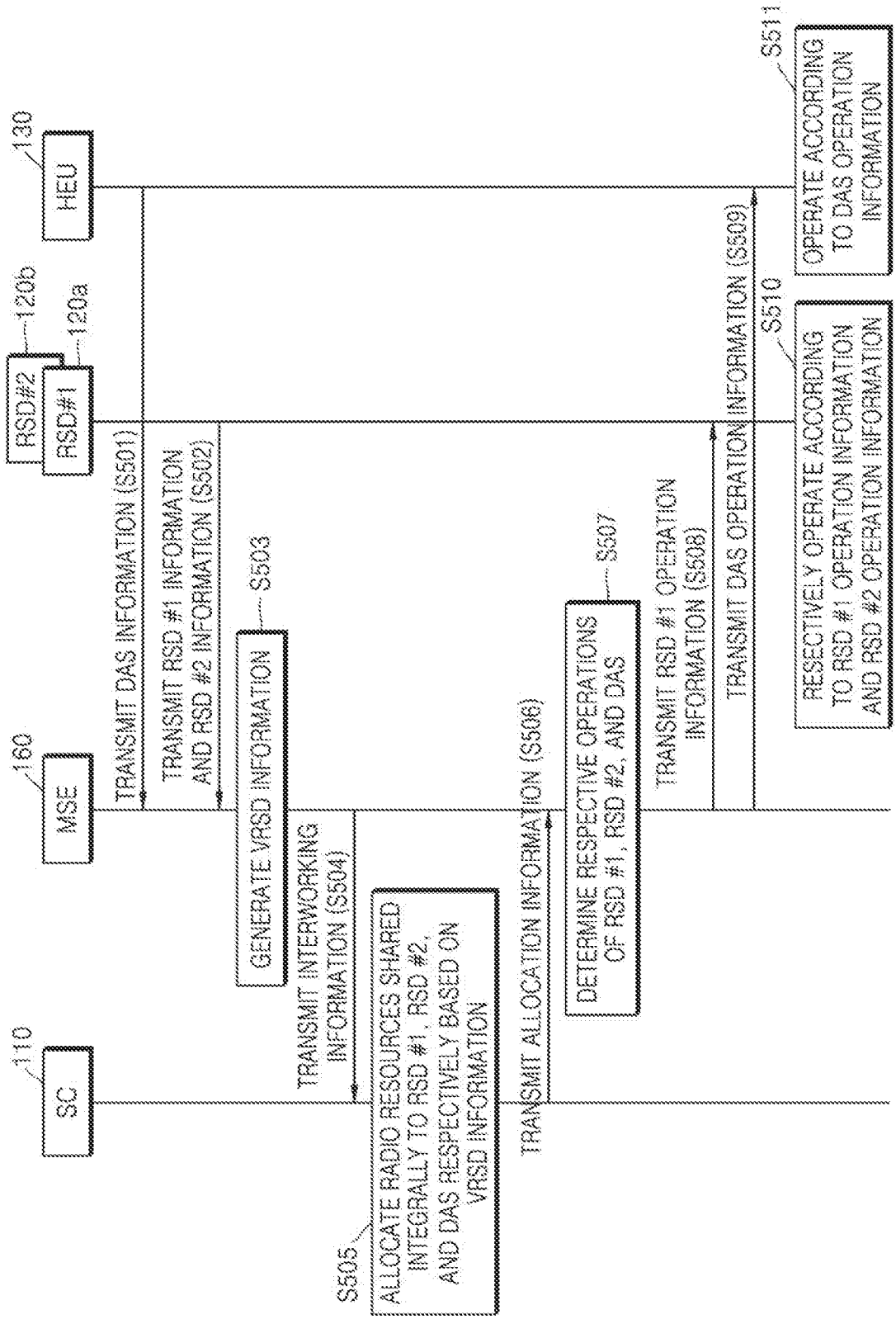

FIG. 3 is a block diagram of a spectrum sharing system according to an embodiment, and FIGS. 4 and 5 are flowcharts for illustrating a method of operating the spectrum sharing system shown in FIG. 3.

In more detail, the spectrum sharing system shown in FIG. 3 illustrates an embodiment in which the HEU 130 of a distributed antenna system interworks with the plurality of RSDs 120a and 120b, and the SC 110, the RSDs 120a and 120b, and the HEU 130 are communicatively connected to each other through the MSE 160 to transmit and receive information necessary for spectrum sharing access.

In FIG. 3, between the plurality of RSDs 120a and 120b and the HEU 130 and between the HEU 130 constituting a DAS and an RU and an EU, radio service signals provided to/from an end-user device are transmitted as analog or digital type signals. Processes related to configurations for this will not be given herein for convenience of explanation. This also applies to FIGS. 6 and 9 below.

In the description of FIGS. 3 to 5, the same or corresponding reference numerals as those in FIGS. 1 to 2F denote the same or corresponding elements, and therefore, repeated descriptions thereof will not be given herein. In the spectrum sharing system according to the present embodiment, allocation operations of shared radio resources for the RSDs 120a and 120b and the HEU 130 will be mainly described.

First, referring to FIGS. 1 to 2F, 3, and 4, in operation S401, the HEU 130 transmits operation information of the DAS (hereinafter referred to as DAS information) to the MSE 160.

The DAS information may include identifiers such as a DAS and/or an HEU constituting the DAS, an indication of radio access technology that the DAS may provide, operating parameters related to the radio access technology (e.g., synchronization, a slot structure, a silence interval, etc.), a geographical location (e.g., a concept related to an installation location of units or an installation location of an antenna connected to the units, and including a geographical area), and the like.

The operating parameters may include, for example, frequency spectrum information, level/power information, operating state information, and the like of a service signal conforming to the radio access technology.

According to an embodiment, the MSE 160 may be provided by a DAS manufacturer, and may be a network management system for the corresponding manufacturer to monitor and control an operating state of the DAS in real time. In this case, the MSE 160 may store DAS information in advance, and accordingly, operation S401 may be omitted, and the MSE 160 may perform the operations described later below based on the pre-stored DAS information.

According to an embodiment, the HEU 130 may transmit the DAS information to the MSE 160 offline.

In operation S402, the RSDs 120a and 120b transmit RSD information RSD #1 and RSD #2 to the MSE 160, respectively.

The RSD information RSD #1 and RSD #2 may include an indication of radio access technologies respectively provided by the RSDs 120a and 120b, operating parameters related to the radio access technologies, a geographic location, a device identifier, an available channel, an available frequency spectrum range, and the like.

According to an embodiment, the MSE 160 may be provided by a manufacturer of the RSDs 120a and 120b or a service provider that provides a spectrum sharing service through the RSDs 120a and 120b and the SC 110, and may be a network management system for the corresponding manufacturer or the service provider to monitor and control an operating state of the RSDs 120a and 120b in real time.

In this case, the MSE 160 may store the RSD information in advance, and accordingly, operation S402 may be omitted, and the MSE 160 may perform the operations described later below based on the pre-stored RSD information.

According to an embodiment, the RSDs 120a and 120b may transmit the RSD information to the MSE 160 offline.

In operation S403, the MSE 160 generates interworking information of the DAS and the RSDs 120a and 120b based on obtained DAS information and the RSD information, and transmits the generated interworking information to the SC 110 in operation S404.

When the RSDs 120a, 120b operate as a signal source of the DAS, the DAS is subject to radio access technology of the RSDs 120a and 120b and operating parameters such as frequency bands related to the radio access technology.

In addition, due to the nature of an in-building wireless communication system, as a geographic location of the RSDs 120a and 120b, that is, their own location (or the location of antennas connected thereto), expands to the location of RUs of the DAS (or the location of antennas connected to the RUs), an indication of the geographic location of the RSDs 120a and 120b substantially coincides with an indication of the geographic location of the DAS.

Accordingly, the MSE 160, based on the DAS information and the RSD information, may generate the interworking information including an indication of an interworking state of the DAS and the RSDs 120a and 120b, an indication of radio access technologies available through the RSDs 120a and 120b and the DAS, operating parameters related to the radio access technologies, a geographic location, an available channel, information about an available frequency spectrum range, and the like. The interworking information may further include the DAS information and the RSD information.

In addition, the MSE 160 may transmit the interworking information to the SC 110 so that the SC 110 may recognize whether the RSDs 120a and 120b interwork with the DAS.

In operation S405, the SC 110 allocates shared radio resources to the RSDs 120a and 120b and the DAS, respectively, based on the received interworking information.

For example, after checking an interworking state of the RSDs 120a and 120b and the HEU 130 and recognizing the spectrum usage amount of priority users in a specific geographical location and/or a specific time set in which the RSDs 120a and 120b and the HEU 130 that interwork with each other are arranged, the SC 110 may allocate available shared radio resources to the RSDs 120a and 120b and the DAS, respectively, in consideration of respective geographical locations, operating states, frequency information, etc. of the RSDs 120a and 120b and the DAS.

According to an embodiment, the SC 110 may allocate radio resources such that shared radio resources allocated to the DAS include the shared radio resources respectively allocated to the RSDs 120a and 120b. This is because the DAS combines/distributes the radio resources of the RSDs 120a and 120b.

In operation S406, the SC 110 transmits allocation information indicating a result of the allocating to the MSE 160.

In operations S407 and S408, the MSE 160 transmits the received allocation information to the RSDs 120a and 120b and the HEU 130, respectively, and in operation S409, the RSDs 120a and 120b and the HEU 130 operate according to the received allocation information.

On the other hand, although not shown in FIG. 4, the HEU 130 transmits the allocation information received from the MSE 160 to other elements of the DAS such as the RU 140 and the EU 150 so that the DAS may operate using the allocated radio resources.

According to certain aspects, the interworking information described above may be transmitted from the MSE 160 to the SC 110 as part of a registration process of the RSDs 120*a* and 120*b* and the HEU 130 for the SC 110. In addition, the interworking information may be transmitted from the MSE 160 to the SC 110 through at least one of periodic status updates of the RSDs 120*a* and 120*b* and the HEU 130 for the SC 110, or resource requests from the RSDs 120*a* and 120*b* and the HEU 130. In some cases, the periodic status updates may include radio environment measurements performed by at least one of the RSDs 120*a* and 120*b* and the HEU 130. This is also substantially the same in a method of allocating shared radio resources illustrated in FIGS. 6 to 8, and 9 to 11 later below.

Next, referring to FIGS. 1 to 2F, 3, and 5, in operation S501, the HEU 130 transmits the DAS information to the MSE 160.

As described above, when the MSE 160 is a network management system provided by the manufacturer of the DAS and the manufacturer monitors and controls a DAS operation state in real time, operation S501 may be omitted.

In operation S402, the RSDs 120*a* and 120*b* transmit the RSD information RSD #1 and RSD #2 to the MSE 160, respectively.

Likewise, when the MSE 160 is a network management system provided by the manufacturer of the RSDs 120*a* and 120*b* and the manufacturer monitors and controls the status of the RSDs 120*a* and 120*b* in real time, operation S502 may be omitted.

In operation S503, the MSE 160 generates virtualized RSD information (hereinafter referred to as VRSD information) based on the obtained DAS information and RSD information, and transmits the generated VRSD information to the SC 110 in operation S504.

The VRSD information may be information for allowing the SC 110 to recognize the DAS and the RSDs 120*a* and 120*b* as one integrated RSD.

The VRSD information may include information about an indication of radio access technology provided through the RSDs 120*a* and 120*b* and the DAS, operating parameters related to the radio access technology, a geographic location, a device identifier, an available channel, an available frequency spectrum range, and the like.

According to an embodiment, the VRSD information may include first VRSD information for recognizing the DAS as a device integrated with the RSD 120*a* or an extension device of the RSD 120*a* and second VRSD information for recognizing the DAS as a device integrated with the RSD 120*b* or an extension device of the RSD 120*b*.

In operation S505, the SC 110 allocates radio resources shared integrally to the RSDs 120*a* and 120*b* and the DAS, respectively, based on the received VRSD information.

For example, after recognizing the RSDs 120*a* and 120*b* and the HEU 130 as one virtualized RSD and recognizing the spectrum usage amount of priority users in a specific geographical location and/or a specific time set in which the RSDs 120*a* and 120*b* and the HEU 130 are arranged, the SC 110 may allocate available shared radio resources to the RSDs 120*a* and 120*b* and the HEU 130, integrally.

According to an embodiment, the SC 110 may recognize the RSD 120*a* and the HEU 130 as one virtualized RSD, may recognize RSD 120*b* and the HEU 130 as another virtualized RSD, and may allocate shared radio resources to the RSD 120*a* and the HEU 130, and to the RSD 120*b* and the HEU 130, respectively.

In operation S506, the SC 110 transmits allocation information indicating a result of allocating the radio resources to the virtualized RSD to the MSE 160.

In operation S507, the MSE 160 determines respective operations of the RSDs 120*a* and 120*b* and the DAS based on the received allocation information. In operation S508, the MSE 160 transmits information about the determined operations for the RSDs 120*a* and 120*b* (hereinafter referred to as RSD operation information) to the RSDs 120*a* and 120*b*, respectively. In operation S509, the MSE 160 transmits information about the determined operation for the DAS (hereinafter referred to as DAS operation information) to the HEU 130.

In operation S510, each of the RSDs 120*a* and 120*b* operates according to the corresponding RSD operation information, and the HEU 130 operates according to the DAS operation information.

On the other hand, the HEU 130 transmits the DAS operation information to other elements of the DAS such as the RU 140 and the EU 150 so that the DAS may operate using the allocated radio resources.

Figure 6:
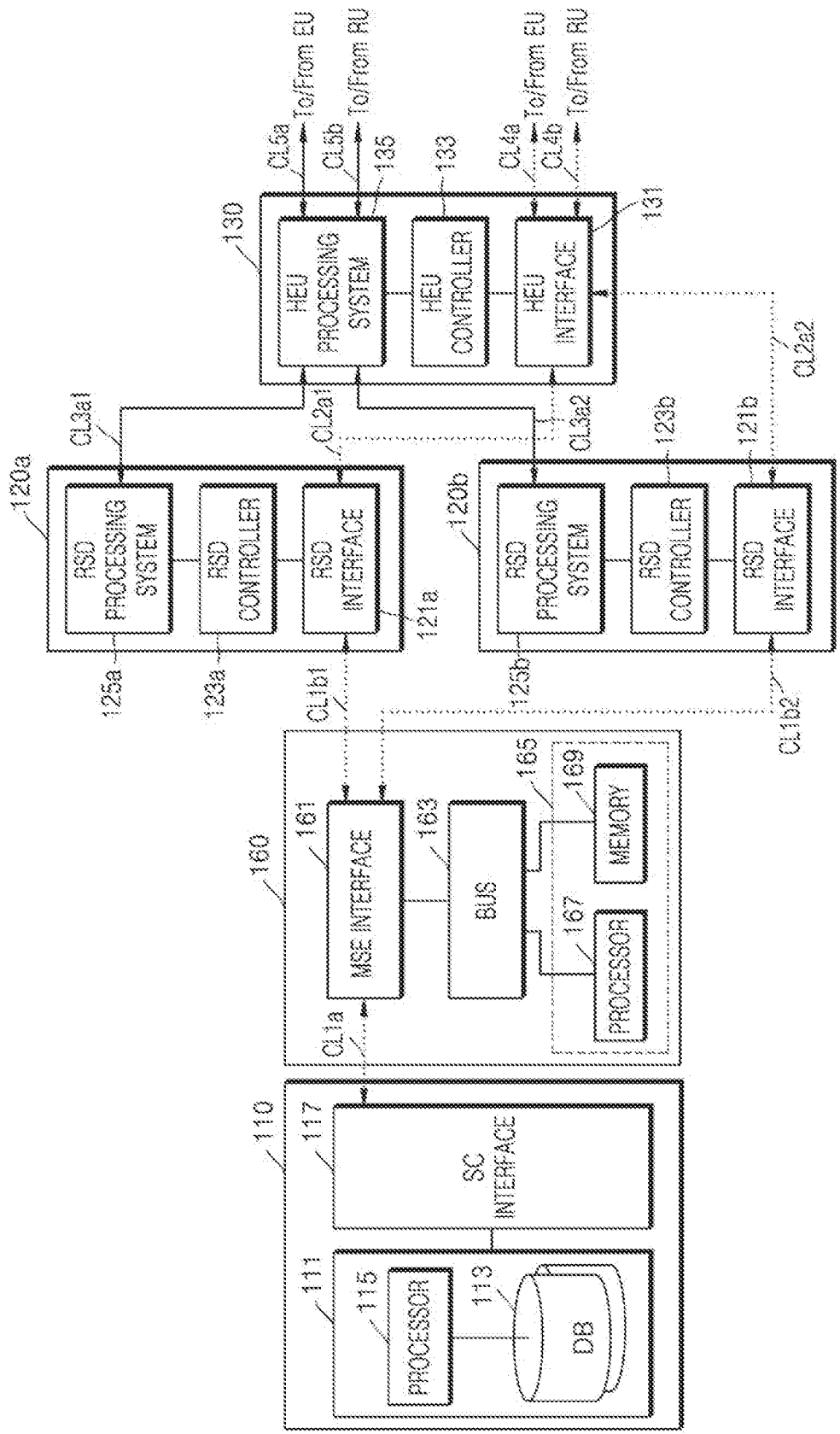
FIG. 6 is a block diagram of a spectrum sharing system according to an embodiment.
Figure 7:
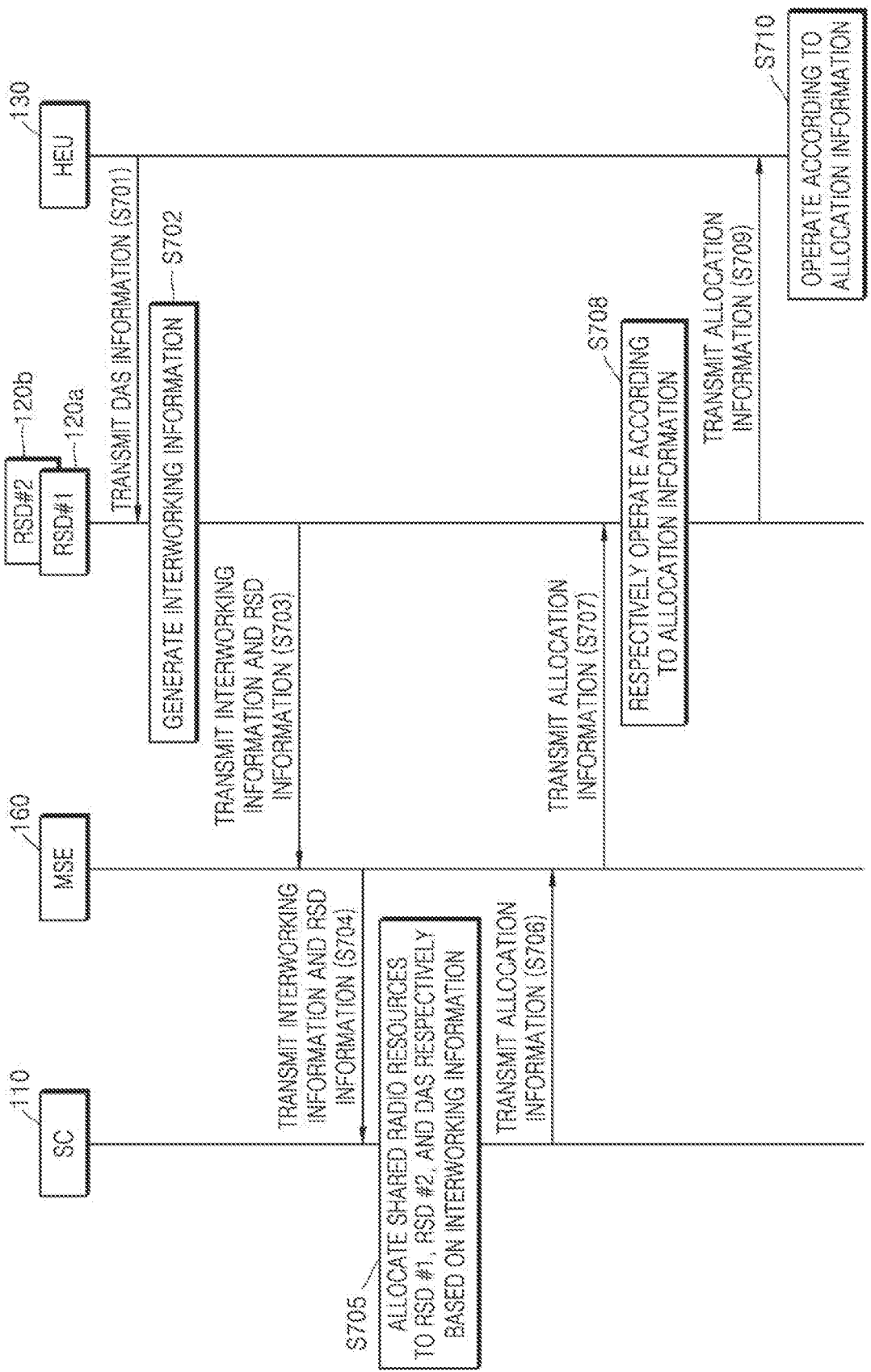
FIGS. 7 and 8 are flowcharts for illustrating a method of operating the spectrum sharing system shown in FIG. 6.
Figure 8:
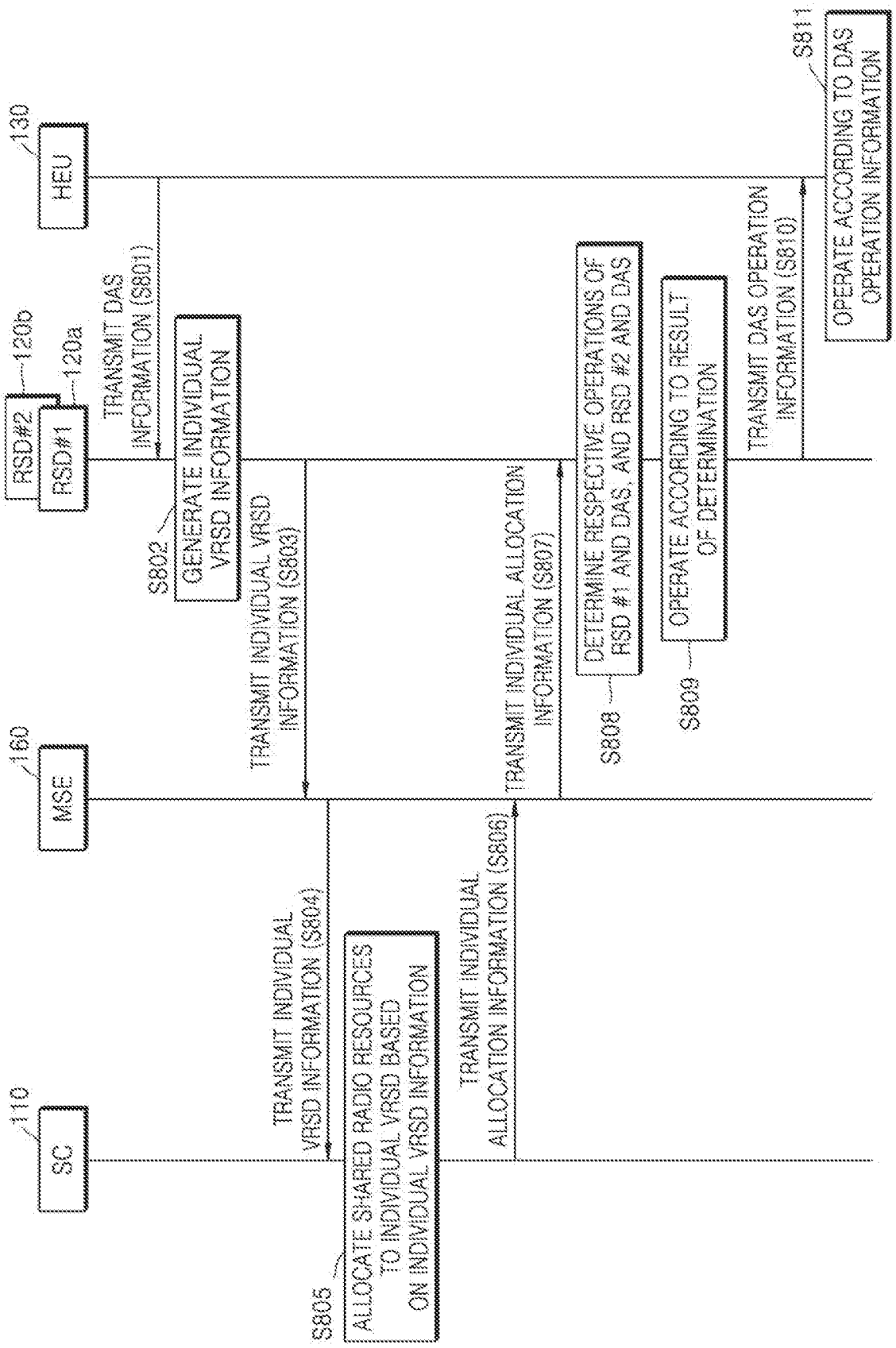

FIG. 6 is a block diagram of a spectrum sharing system according to an embodiment, and FIGS. 7 and 8 are flowcharts for illustrating a method of operating the spectrum sharing system shown in FIG. 6.

In more detail, the spectrum sharing system shown in FIG. 6 illustrates an embodiment in which the HEU 130 of a DAS interworks with the RSDs 120*a* and 120*b*, and the SC 110 and the RSDs 120*a* and 120*b* are communicatively connected to each other through the MSE 160 to transmit and receive information necessary for spectrum sharing access.

In the description of FIGS. 6 to 8, the same or corresponding reference numerals as those in FIGS. 1 to 2F denote the same or corresponding elements, and therefore, repeated descriptions thereof will not be given herein. In the spectrum sharing system according to the present embodiment, allocation operations of shared radio resources for the RSDs 120*a* and 120*b* and the HEU 130 will be mainly described.

First, referring to FIGS. 1 to 2F, 6, and 7, in operation S701, the HEU 130 generates information of the DAS (hereinafter referred to as DAS information) and transmits the DAS information to any one of the RSDs 120*a* and 120*b*. In some embodiments, either RSD receiving the DAS information may function as a domain proxy.

The DAS information, which is information related to a radio service of the RSDs 120*a* and 120*b* provided to end-user devices through the DAS, may include, for example, radio access technologies respectively provided from the RSDs 120*a* and 120*b* to the node units (HEU, RU, and EU) of the DAS, operating parameters related to the radio access technologies, a geographic location, a device identifier, and the like.

According to an embodiment, when neither of the RSDs 120*a* and 120*b* operates as a domain proxy, the HEU 130 may transmit the DAS information to each of the RSDs 120*a* and 120*b*.

In operation S702, any one of the RSDs 120*a* and 120*b* generates interworking information of the RSDs 120*a* and 120*b* and the DAS based on the DAS information received from the HEU 130.

The interworking information, which is information directly or indirectly indicating whether or not the RSDs 120a and 120b interwork with the DAS, may include an indication of an interworking state, an indication of radio access technology provided by the RSDs 120a and 120b through the DAS, operating parameters related to the radio access technologies, a geographic location, a device identifier, an available channel, an available frequency spectrum range, and the like.

In addition, because the DAS information includes all information such as the radio access technologies provided by the RSDs 120a and 120b, only one of the RSDs 120a and 120b may generate the interworking information based on the DAS information.

According to an embodiment, when the RSDs 120a and 120b do not function as a domain proxy, each of the RSDs 120a and 120b may receive the DAS information from the HEU 130 to generate interworking information.

In operation S703, any one of the RSDs 120a and 120b transmits the interworking information to the MSE 160, and transmits its own information (hereinafter referred to as RSD information) and other RSD information to the MSE 160. However, although not shown, the one RSD may also transmit the received DAS information to the MSE 160.

According to an embodiment, when the RSDs 120a and 120b do not function as domain proxies, each of the RSDs 120a and 120b may transmit its own RSD information along with the generated interworking information to the MSE 160.

In operation S704, the MSE 160 collects the received interworking information and the RSD information and transmits it to the SC 110.

In operation S705, the SC 110 allocates shared radio resources to the RSDs 120a and 120b and the DAS, respectively, considering an interworking state based on the received interworking information and the RSD information.

In operation S706, the SC 110 transmits allocation information indicating a result of the allocating to the MSE 160, in operation S707, the MSE 160 transmits the received allocation information to any one of the RSDs 120a and 120b, and in operation S708, the one RSD transmits the allocation information to the other RSD, and the RSDs 120a and 120b operate according to the received allocation information, respectively.

According to an embodiment, when neither of the RSDs 120a and 120b operates as a domain proxy, the MSE 160 may transmit the allocation information to each of the RSDs 120a and 120b.

In operation S709, the one of the RSDs 120a and 120b transmits the received allocation information to the HEU 130, and in operation S710, the HEU 130 operates according to the received allocation information.

In addition, the HEU 130 transmits the allocation information received from the one RSD to other elements of the DAS, such as the RU 140 and the EU 150, so that the DAS may operate using the allocated radio resources.

Next, referring to FIGS. 1 to 2F, 6, and 8, in operation S801, the HEU 130 transmits DAS information to each of the RSDs 120a and 120b, and in operation S802, each of the RSDs 120a and 120b synthesizes its own information and the DAS information to generate individual virtualized RSD information (hereinafter referred to as individual VRSD information).

The individual VRSD information may be information that recognizes a DAS as a device integrated with any one of the RSDs 120a and 120b or an extension device for the any one, and may include an indication of radio access technology provided through any one of the RSDs 120a and 120b and the DAS, operation parameters related to the radio access technology, a geographic location, a device identifier, and the like.

Subsequently, in operation S803, the RSDs 120a and 120b transmit the individual VRSD information to the MSE 160, respectively, and in operation S804, the MSE 160 collects the individual VRSD information and transmits the individual VRSD information to the SC 110.

Unlike the embodiments described with reference to FIG. 7 (embodiments in which any one of the RSDs may or may not operate as a domain proxy), the individual VRSD information is transmitted to the SC 110 through the MSE 160 so that the SC 110 recognizes the DAS connected to each of the RSDs 120a and 120b as an integrated (or extended) device.

In operation S805, the SC 110, based on the received individual VRSD information, allocates radio resources shared integrally to the RSD 120a and the DAS (i.e., one virtualized RSD), and the RSD 120b and the DAS (i.e. another virtualized RSD), respectively.

In operation S806, the SC 110 transmits individual allocation information indicating a result of the respectively allocating radio resources to the virtualized RSDs to the MSE 160, and in operation S807, the MSE 160 transmits the individual allocation information to the RSDs 120a and 120b, respectively.

In operation S808, the RSD 120a determines respective operations of the RSD 120a and the DAS based on the received individual assignment information, and the RSD 120b determines respective operations of the RSD 120b and the DAS based on the received individual allocation information.

In operation S809, each of the RSDs 120a and 120b operates according to a result of the determination.

In operation S810, each of the RSDs 120a and 120b transmits information about the determined operation of the DAS (hereinafter referred to as DAS operation information) to the HEU 130. In operation S811, the HEU 130 operates according to the pieces of DAS operation information.

On the other hand, the HEU 130 transmits the pieces of DAS operation information to other elements of the DAS such as the RU 140 and the EU 150 so that the DAS may operate using the allocated radio resources.

Figure 9:
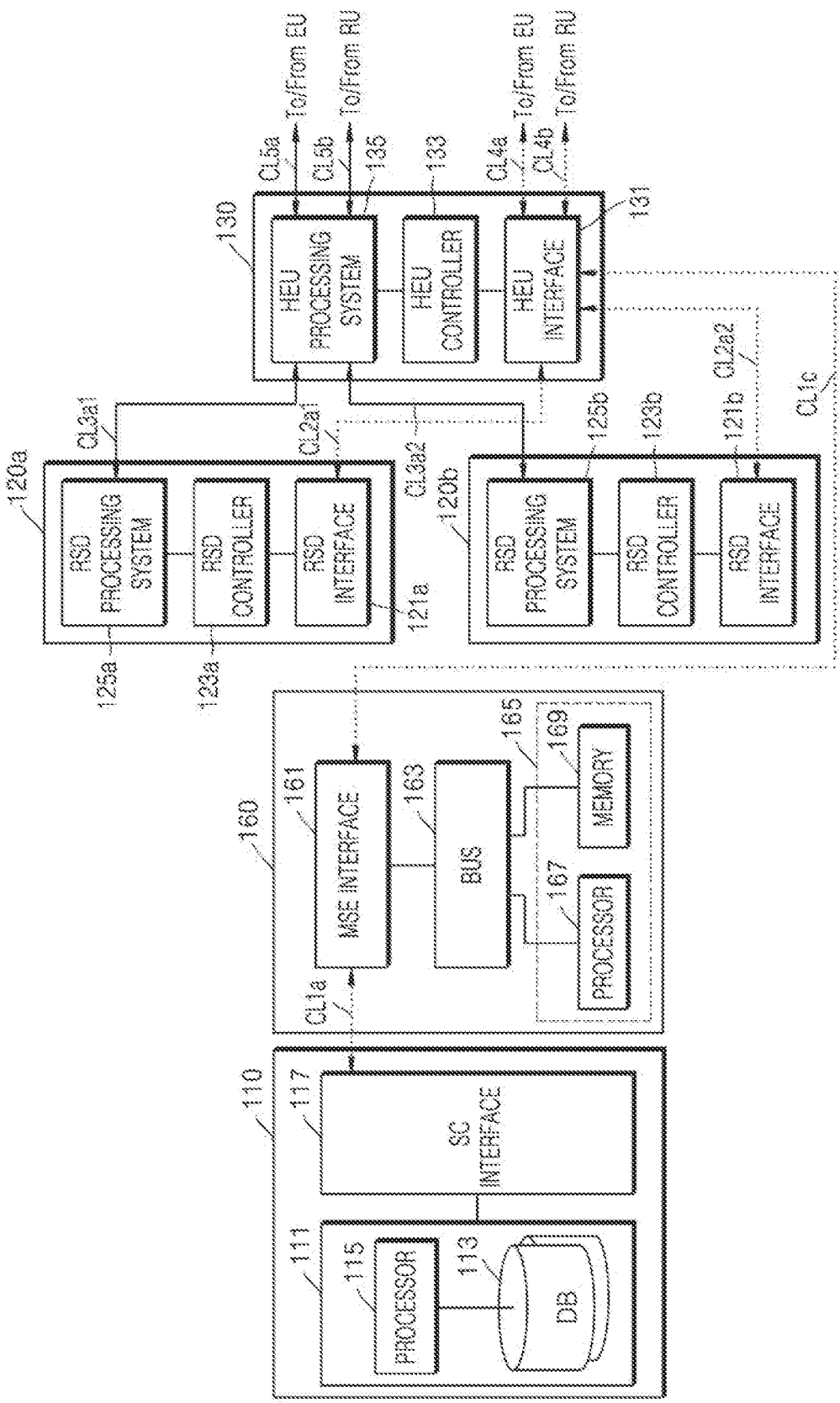
FIG. 9 is a block diagram of a spectrum sharing system according to an embodiment.
Figure 10:
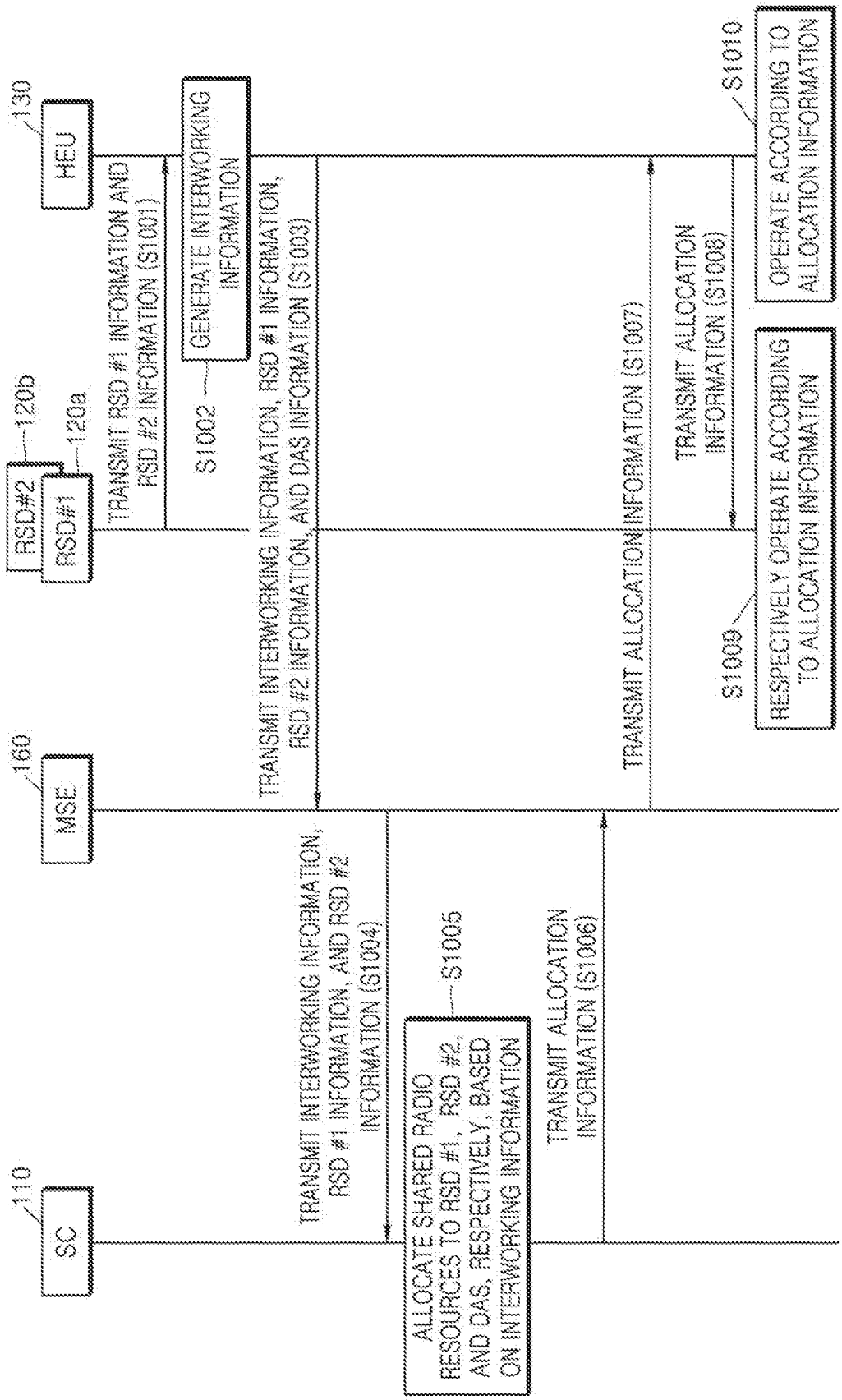
FIGS. 10 and 11 are flowcharts for illustrating a method of operating the spectrum sharing system shown in FIG. 9.
Figure 11:
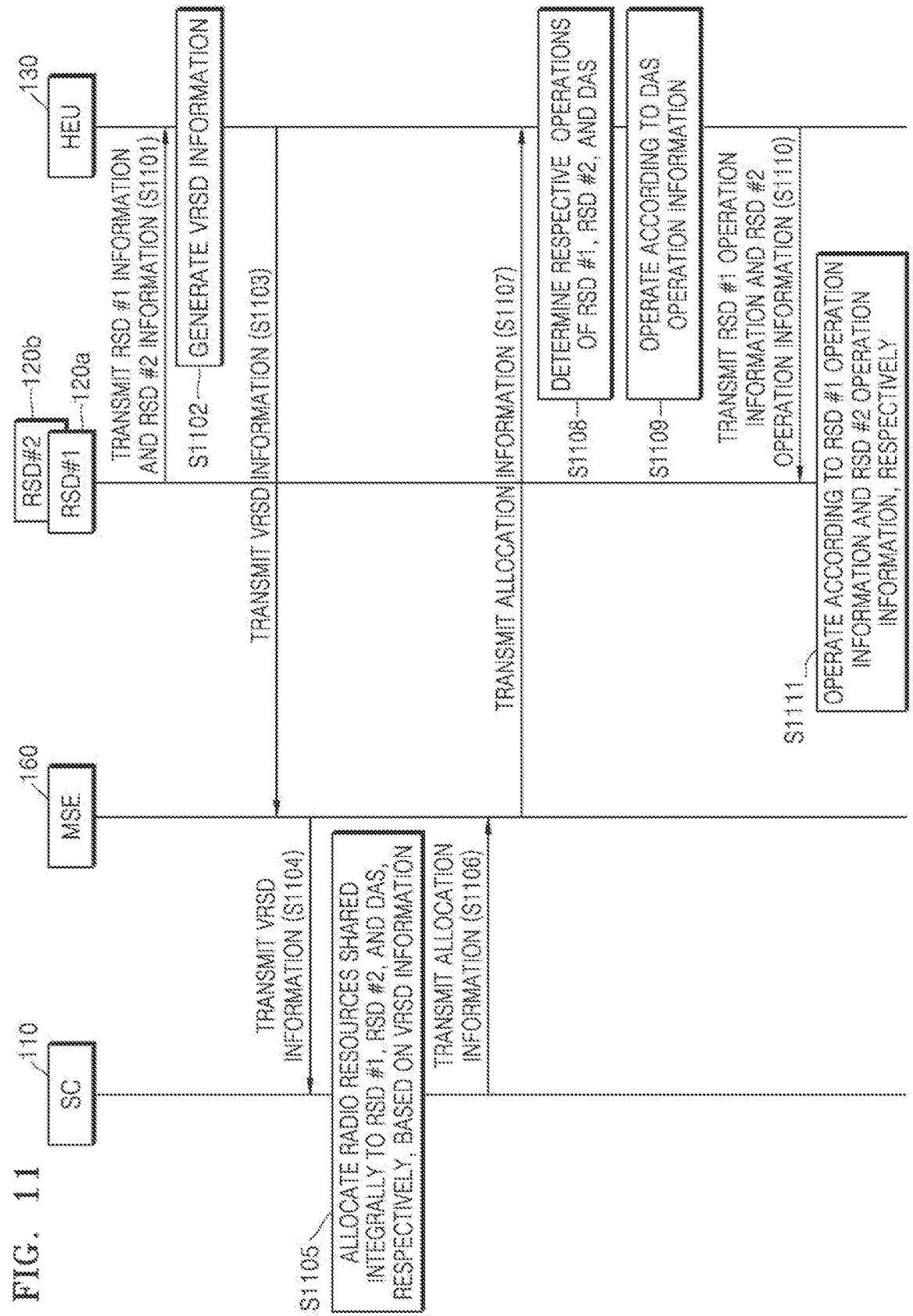

FIG. 9 is a block diagram of a spectrum sharing system according to an embodiment, and FIGS. 10 and 11 are flowcharts for illustrating a method of operating the spectrum sharing system shown in FIG. 9.

In more detail, the spectrum sharing system shown in FIG. 9 illustrates an embodiment in which the HEU 130 of a DAS interworks with the RSDs 120a and 120b, and the SC 110 and the HEU 130 are communicatively connected to each other through the MSE 160 to transmit and receive information necessary for spectrum sharing access.

In the description of FIGS. 9 to 11, the same or corresponding reference numerals as those in FIGS. 1 to 2F denote the same or corresponding elements, and therefore, repeated descriptions thereof will not be given herein. In the spectrum sharing system according to the present embodiment, allocation operations of shared radio resources for the RSDs 120a and 120b and the HEU 130 will be mainly described.

First, referring to FIGS. 1 to 2F, 9, and 10, in operation S1001, the RSDs 120a and 120b respectively generate their own information (hereinafter referred to as RSD #1 information and RSD #2 information) and transmit the RSD #1 information and RSD #2 information to the HEU 130.

The RSD #1 information and the RSD #2 information may include an indication of radio access technologies respectively provided by the RSDs 120a and 120b, operating parameters related to the radio access technologies, a geographic location, a device identifier, an available channel, an available frequency spectrum range, and the like.

In operation S1002, the HEU 130 generates interworking information of the plurality of RSDs 120a and 120b and the DAS based on the RSD #1 information and RSD #2 information respectively received from the plurality of RSDs 120a and 120b.

Subsequently, in operation S1003, the HEU 130 transmits the interworking information, the RSD #1 information and the RSD #2 information respectively received from the RSDs 120a and 120b, and its own information (hereinafter referred to as DAS information) to the MSE 160. As a domain proxy, the HEU 130 may transmit information about other interworking elements, for example, the RSDs 120a and 120b and the DAS, to the MSE 160 together with the interworking information.

In operation S1004, the MSE 160 collects the received interworking information and the like and transmits it to the SC 110.

In operation S1005, the SC 110 allocates shared radio resources to the RSDs 120a and 120b and the DAS, respectively, considering an interworking state based on the received interworking information and the like.

In operation S1006, the SC 110 transmits allocation information indicating a result of the allocating to the MSE 160, in operation S1007, the MSE 160 transmits the allocation information to the HEU 130, and in operation S1008, the HEU 130 transmits the received allocation information to the RSDs 120a and 120b.

In operation S1009, the HEU 130 and the RSDs 120a and 120b operate according to the allocation information.

Although not shown in FIG. 10, the HEU 130 transmits the allocation information received from the SC 110 to other elements of the DAS such as the RU 140 and the EU 150 so that the DAS may operate using the allocated radio resources.

Next, referring to FIGS. 1 to 2F, 9, and 11, in operation S1101, the RSDs 120a and 120b respectively transmit their own information (hereinafter referred to as RSD #1 information and RSD #2 information) to the HEU 130, and in operation S1102, the HEU 130 generates virtualized RSD information (hereinafter referred to as VRSD information) by synthesizing its own information and the RSD #1 information and RSD #2 information.

The VRSD information may be information that recognizes a DAS as a device integrated with the RSDs 120a and 120b or an extension device for the RSDs 120a and 120b, and may include radio access technology provided through the RSDs 120a and 120b and the DAS, operation parameters related to the radio access technology, a geographic location, a device identifier, an available channel, an available frequency spectrum range, and the like.

According to an embodiment, the VRSD information may include first VRSD information for recognizing the DAS as a device integrated with the RSD 120a or an extension device of the RSD 120a and second VRSD information for recognizing the DAS as a device integrated with the RSD 120b or an extension device of the RSD 120b.

In operation S1103, the HEU 130 transmits the VRSD information to the MSE 160, and in operation S1104, the MSE 160 transmits the VRSD information to the SC 110.

In operation S1105, the SC 110 allocates radio resources shared integrally to the RSDs 120a and 120b and the DAS, respectively, based on the received VRSD information.

In operation S1106, the SC 110 transmits allocation information indicating a result of allocating the shared radio resources to the MSE 160, and in operation S1107, the MSE 160 transmits the allocation information to the HEU 130.

In operation S1108, the HEU 130 determines respective operations of the RSDs 120a and 120b and the DAS based on the received allocation information.

In operation S1109, the HEU 130 operates according to a result of the determination of the DAS.

The HEU head-end unit 130 transmits information about the result of the determination to other elements of the DAS such as the RU 140 and EU 150 so that the DAS may operate using the allocated radio resources.

In operation S1110, the HEU 130 transmits information about the determined operations of the RSDs 120a and 120b (RSD #1 operation information and RSD #2 operation information) to the RSDs 120a and 120b. Accordingly, in operation S1111, the RSDs 120b and 120b operate according to the received operation information, respectively.

FIGS. 3 to 11 describe the embodiment in which the HEU 130 interworks with the plurality of RSDs 120a and 120b above. However, even in an embodiment in which the RU 140 interworks with at least one RSD, the allocation operation of the shared radio resources as shown in FIGS. 3 to 11 will be possible.

Further, FIGS. 4, 5, 7, 8, 10, and 11 and the methods described with reference thereto include one or more operations and/or actions for achieving the methods. The operations and/or actions may be interchanged with one another without departing from the scope of the claims. In other words, the order and/or use of specific operations and/or actions may be modified without departing from the scope of the claims, unless a certain order for the operations and/or actions is specified.

In addition, various operations of the methods described above may be performed by any suitable means capable of performing corresponding functions. The means includes, but is not limited to, various hardware and/or software components and/or modules such as an application specific integrated circuit (ASIC) or a processor. In general, when there are operations corresponding to the drawings, these operations may have a corresponding counterpart and functional components having the same number as the number of the counterpart.

The various illustrative logic blocks, modules, circuits, and processors described in connection with the disclosure may be implemented or performed by a general-purpose processor designed to perform the functions disclosed herein, a digital signal processor (DSP), an ASIC, a field-programmable gate array (FPGA) or other programmable logic device (PLD), a discrete gate or transistor logic device, discrete hardware components, or any combination thereof. The general-purpose processor may be a microprocessor, but may alternatively be any commercially available processor, controller, microcontroller, or state machine. The processor may also be implemented in a combination of computing devices, for example, a combination of the DSP and the microprocessor, a plurality of microprocessors, one or more microprocessors in connection with a DSP core, or any other configuration.

According to embodiments of the disclosure, when a spectrum sharing system interworks with a distributed antenna system, a system controller of the spectrum sharing system communicates with radio service devices of the spectrum sharing system and node units of the distributed antenna system through a management system entity.

Accordingly, as the spectrum sharing system is able to minimize a management and control burden of the system controller and efficiently allocate and operate shared radio resources by considering whether to interwork with the distributed antenna system, and the distributed antenna system interworks with the spectrum sharing system, it is possible to effectively prevent unexpected interference from occurring in a specific area and/or at a specific time.

Effects obtainable by the disclosure are not limited to the effects described above, but other effects not described herein may be clearly understood by one of ordinary skill in the art from the above descriptions.

Numerous modifications and adaptations will be readily apparent to one of ordinary skill in the art without departing from the spirit and scope of the disclosure.

In this regard, the present embodiments may have different forms and should not be construed as being limited to the descriptions set forth herein.

While the disclosure has been particularly shown and described with reference to embodiments thereof, it will be understood that various changes in form and details may be made therein without departing from the spirit and scope of the following claims.

What is claimed is:

1. A method of interoperating a distributed antenna system (DAS) with a spectrum sharing system (SSS), the method comprising:
   generating, by a management system entity (MSE), interoperating information based on DAS information and radio service device (RSD) information;
   transmitting, by the MSE, the interoperating information to a system controller of the SSS, wherein the system controller of the SSS is configured to control spectrum sharing in the SSS; and
   receiving, by the MSE, allocation information including a result of allocating shared radio resources to the DAS and at least one RSD, respectively, according to the interoperating information from the system controller.

2. The method of claim 1, wherein the interoperating information comprises information about at least two of an indication of an interoperating state of the at least one RSD and the DAS, an indication of radio access technology (RAT) provided by the at least one RSD through the DAS, operation parameters related to the RAT, a geographic location, an available channel, and an available frequency spectrum range.

3. The method of claim 1, further comprising:
   before the generating of the interoperating information,
   receiving, by the MSE, the DAS information from a node unit of the DAS; and
   receiving, by the MSE, the RSD information from the at least one RSD.

4. The method of claim 1, wherein the transmitting of the interoperating information comprises transmitting, by the MSE, the interoperating information to the system controller as part of a registration process for the system controller of the DAS and the at least one RSD.

5. The method of claim 1, wherein the transmitting of the interoperating information comprises transmitting, by the MSE, the interoperating information to the system controller through at least one of a resource request to the system controller or periodic status update of the DAS and the at least one RSD.

6. The method of claim 1, further comprising:
   after the receiving of the allocation information,
   transmitting, by the MSE, the allocation information to a node unit of the DAS; and
   transmitting, by the MSE, the allocation information to the at least one RSD.

7. The method of claim 1, wherein the MSE is configured to operate and manage the DAS by controlling at least one node unit of the DAS.

8. The method of claim 7, wherein the at least one node unit of the DAS is a head-end unit of the DAS communicatively connected to the at least one RSD, or a remote unit of the DAS communicatively connected to the at least one RSD.

9. The method of claim 1, wherein the MSE is configured to control an operation of the at least one RSD to operate and manage the SSS.

10. A method of interoperating a distributed antenna system (DAS) with a spectrum sharing system (SSS), the method comprising:
    generating, by a management system entity (MSE), virtualized radio service device (RSD) information based on DAS information and RSD information;
    transmitting, by the MSE, the virtualized RSD information to a system controller of the SSS, wherein the system controller of the SSS is configured to control spectrum sharing in the SSS;
    receiving, by the MSE, allocation information including a result of allocating radio resources integrally shared to the DAS and the at least one RSD according to the virtualized RSD information from the system controller; and
    determining, by the MSE, an operation of the DAS based on the allocation information.

11. The method of claim 10, wherein the virtualized RSD information is information that causes the system controller of the SSS to recognize the at least one RSD and the DAS as one device or the DAS as an extension device of the at least one RSD.

12. The method of claim 10, wherein the virtualized RSD information comprises information about at least two of an indication of a radio access technology (RAT) integrally supported by the at least one RSD and the DAS, operation parameters related to the RAT, a geographic location, an available channel, and an available frequency spectrum range.

13. The method of claim 10, wherein the determining of the operation of the DAS comprises determining, by the MSE, an operation of the at least one RSD based on the allocation information.

14. The method of claim 10, wherein the transmitting of the virtualized RSD information comprises transmitting, by the MSE, the virtualized RSD information to the system controller as part of a registration process for the system controller of the DAS and the at least one RSD.

15. The method of claim 10, wherein the transmitting of the virtualized RSD information comprises transmitting, by the MSE, the virtualized RSD information to the system controller through at least one of a resource request to the system controller or periodic status update of the DAS and the at least one RSD.

16. A method of interoperating a distributed antenna system (DAS) with a spectrum sharing system (SSS), the method comprising:
    receiving, by a management system entity (MSE), one of interoperating information and virtualized radio service device (RSD) information from a node unit of the DAS or at least one RSD;

transmitting, by the MSE, the interoperating information or the virtualized RSD information to a system controller of the SSS;

receiving, by the MSE, allocation information including a result of allocating shared radio resources according to the interoperating information or the virtualized RSD information from the system controller; and transmitting, by the MSE, the allocation information to the node unit of DAS and the at least one RSD.

17. The method of claim 16, wherein the interoperating information or the virtualized RSD information is generated by one of the node unit of the DAS and the at least one RSD.

* * * * *